(12) United States Patent
Karabinis

(10) Patent No.: US 6,684,057 B2
(45) Date of Patent: Jan. 27, 2004

(54) SYSTEMS AND METHODS FOR TERRESTRIAL REUSE OF CELLULAR SATELLITE FREQUENCY SPECTRUM

(75) Inventor: Peter D. Karabinis, Cary, NC (US)

(73) Assignee: Mobile Satellite Ventures, LP, Reston, VA (US)

( * ) Notice: Subject to any disclaimer, the term of this patent is extended or adjusted under 35 U.S.C. 154(b) by 206 days.

(21) Appl. No.: 10/074,097

(22) Filed: Feb. 12, 2002

(65) Prior Publication Data

US 2003/0054760 A1 Mar. 20, 2003

Related U.S. Application Data

(60) Provisional application No. 60/322,240, filed on Sep. 14, 2001.

(51) Int. Cl.[7] .................................................. H04Q 7/20
(52) U.S. Cl. ..................... 455/12.1; 455/13.5; 455/427; 455/63.3
(58) Field of Search ............................... 455/12.1, 13.3, 455/427, 428, 429, 63.1, 63.2, 63.3

(56) References Cited

U.S. PATENT DOCUMENTS

| | | | |
|---|---|---|---|
| 5,303,286 A | | 4/1994 | Wiedeman |
| 5,511,233 A | * | 4/1996 | Otten ........................... 455/524 |
| 5,734,678 A | * | 3/1998 | Paneth et al. ................ 375/240 |
| 5,761,605 A | | 6/1998 | Tawil et al. |
| 5,937,332 A | * | 8/1999 | Karabinis ................... 455/12.1 |
| 6,169,878 B1 | * | 1/2001 | Tawil et al. ................... 725/63 |

OTHER PUBLICATIONS

International Search Report, PCT/US02/24783, Dec. 10, 2002.
International Preliminary Examination Report, PCT/US02/24783, Apr. 30, 2003.

* cited by examiner

*Primary Examiner*—Nay Maung
*Assistant Examiner*—Edan Orgad
(74) *Attorney, Agent, or Firm*—Myers Bigel Sibley & Sajovec

(57) ABSTRACT

A satellite radiotelephone frequency can be reused terrestrially by an ancillary terrestrial network even within the same satellite cell, using interference cancellation techniques. Moreover, the ancillary terrestrial network can use a modified range of satellite band forward link frequencies for transmission, to reduce interference with out-of-band receivers. A modified range of satellite band forward link frequencies that is used by the ancillary terrestrial network can include only a subset of the standard satellite band forward link frequencies to provide a guard band, can include power levels that monotonically decrease as a function of increasing frequency and/or can include two or more contiguous slots per frame that are left unoccupied and/or are transmitted at reduced maximum power. Time division duplex operation of the ancillary terrestrial network may also be provided over at least a portion of satellite band return frequencies. Full or partial reverse mode operation of the ancillary terrestrial network also may be provided, where at least some of the forward link and return link frequencies are interchanged with the conventional satellite forward link and reverse link frequencies.

305 Claims, 9 Drawing Sheets

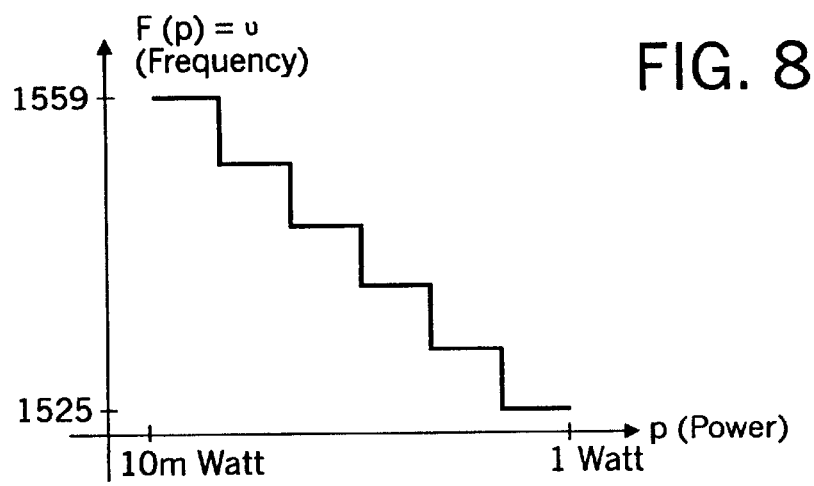
FIG. 8
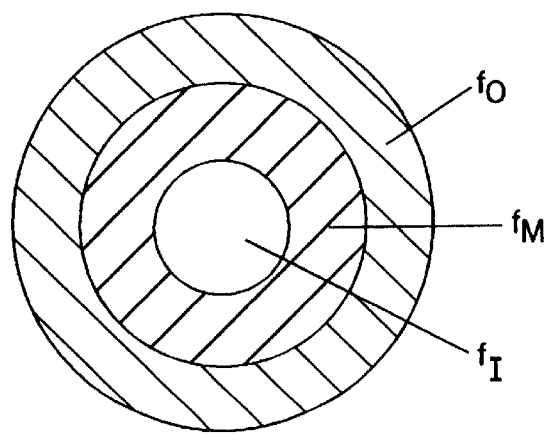
FIG. 9
FIG. 10
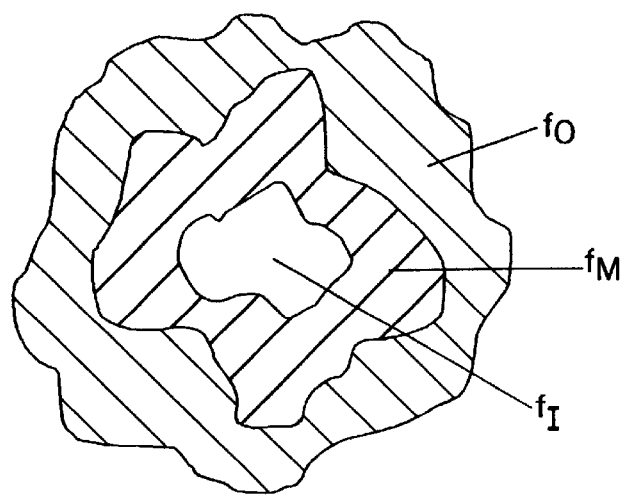

SYSTEMS AND METHODS FOR TERRESTRIAL REUSE OF CELLULAR SATELLITE FREQUENCY SPECTRUM

CROSS-REFERENCE TO PROVISIONAL APPLICATION

This application claims the benefit of provisional Application No. 60/322,240, filed Sep. 14, 2001, entitled Systems and Methods for Terrestrial Re-Use of Mobile Satellite Spectrum, assigned to the assignee of the present application, the disclosure of which is hereby incorporated herein by reference in its entirety as if set forth fully herein.

FIELD OF THE INVENTION

This invention relates to radiotelephone communications systems and methods, and more particularly to terrestrial cellular and satellite cellular radiotelephone communications systems and methods.

BACKGROUND OF THE INVENTION

Satellite radiotelephone communications systems and methods are widely used for radiotelephone communications. Satellite radiotelephone communications systems and methods generally employ at least one space-based component, such as one or more satellites that are configured to wirelessly communicate with a plurality of satellite radiotelephones.

A satellite radiotelephone communications system or method may utilize a single antenna beam covering an entire area served by the system. Alternatively, in cellular satellite radiotelephone communications systems and methods, multiple beams are provided, each of which can serve distinct geographical areas in the overall service region, to collectively serve an overall satellite footprint. Thus, a cellular architecture similar to that used in conventional terrestrial cellular radiotelephone systems and methods can be implemented in cellular satellite-based systems and methods. The satellite typically communicates with radiotelephones over a bidirectional communications pathway, with radiotelephone communication signals being communicated from the satellite to the radiotelephone over a downlink or forward link, and from the radiotelephone to the satellite over an uplink or return link.

The overall design and operation of cellular satellite radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and a pager, Internet/intranet access, Web browser, organizer, calendar and/or a global positioning system (GPS) receiver; and/or conventional laptop and/or palmtop computers or other appliances, which include a radio frequency transceiver.

Terrestrial networks can enhance cellular satellite radiotelephone system availability, efficiency and/or economic viability by terrestrially reusing at least some of the frequency bands that are allocated to cellular satellite radiotelephone systems. In particular, it is known that it may be difficult for cellular satellite radiotelephone systems to reliably serve densely populated areas, because the satellite signal may be blocked by high-rise structures and/or may not penetrate into buildings. As a result, the satellite spectrum may be underutilized or unutilized in such areas. The use of terrestrial retransmission can reduce or eliminate this problem.

Moreover, the capacity of the overall system can be increased significantly by the introduction of terrestrial retransmission, since terrestrial frequency reuse can be much denser than that of a satellite-only system. In fact, capacity can be enhanced where it may be mostly needed, i.e., densely populated urban/industrial/commercial areas. As a result, the overall system can become much more economically viable, as it may be able to serve a much larger subscriber base. Finally, satellite radiotelephones for a satellite radiotelephone system having a terrestrial component within the same satellite frequency band and using substantially the same air interface for both terrestrial and satellite communications can be more cost effective and/or aesthetically appealing. Conventional dual band/dual mode alternatives, such as the well known Thuraya, Iridium and/or Globalstar dual mode satellite/terrestrial radiotelephone systems, may duplicate some components, which may lead to increased cost, size and/or weight of the radiotelephone.

One example of terrestrial reuse of satellite frequencies is described in U.S. Pat. No. 5,937,332 to the present inventor Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink signal received from a satellite thereby increasing the effective downlink margin in the vicinity of the satellite telecommunications repeaters and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

In view of the above discussion, there continues to be a need for systems and methods for terrestrial reuse of cellular satellite frequencies that can allow improved reliability, capacity, cost effectiveness and/or aesthetic appeal for cellular satellite radiotelephone systems, methods and/or satellite radiotelephones.

SUMMARY OF THE INVENTION

Some embodiments of the present invention allow a satellite radiotelephone frequency to be reused terrestrially within the same satellite cell, while allowing intra-system interference to be reduced. In particular, some of these embodiments include a space-based component, such as a satellite, that is configured to receive wireless communications from a first radiotelephone in a satellite footprint, comprising one or more cells, over a satellite radiotelephone frequency band. An ancillary terrestrial network, comprising one or more ancillary terrestrial components, is configured to receive wireless communications from a second radiotelephone in the satellite footprint over the satellite radiotelephone frequency band. The space-based component also receives the wireless communications from the second radiotelephone in the satellite footprint over the satellite radiotelephone frequency band as interference, along with the wireless communications that are received from the first radiotelephone in the satellite footprint over the satellite radiotelephone frequency band. An interference reducer is responsive to the space-based component and to the ancillary terrestrial network, and is configured to reduce the interference from the wireless communications that are received by the space-based component from the second radiotelephone in the satellite footprint over the satellite radiotelephone frequency band, using the wireless communications that are received by the ancillary terrestrial network from the second radiotelephone in the satellite footprint over the satellite radiotelephone frequency band.

In other embodiments, the ancillary terrestrial network is closer to the first and second radiotelephones than is the space-based component, such that the wireless communications from the second radiotelephone are received by the ancillary terrestrial network prior to being received by the space-based component. In these embodiments, the interference reducer is configured to generate at least one delayed replica of the wireless communications from the second radiotelephone that are received by the ancillary terrestrial network and to subtract the delayed replica of the wireless communications from the second radiotelephone that are received by the ancillary terrestrial network, from the wireless communications that are received from the space-based component. Adaptive interference-canceling techniques, for example Least Mean Squared Error (LMSE), Kalman, zero-forcing and/or various variations thereof, can be used to update the coefficients of transversal filters to provide adaptive interference reduction. Thus, an entire band of satellite frequencies may be reused terrestrially within any given satellite cell, according to these embodiments of the invention.

Other embodiments of the invention can provide a reconfigurable (multiple-mode) ancillary terrestrial component, that operates conventionally in a first mode, and that operates in a second mode to reduce interference by the ancillary terrestrial component with other, out of band, satellite-based systems, such as GPS/GLONASS systems. As is well known to those having skill in the art, GPS and GLONASS are satellite-based systems that can be used to measure positions on earth.

In particular, these embodiments of radiotelephone systems and methods include a space-based component that is configured to receive wireless communications from radiotelephones over a first range of satellite band return link frequencies and to transmit wireless communications to the radiotelephones over a second range of satellite band forward link frequencies that are spaced apart from the first range. A multiple mode ancillary terrestrial component is selectively configured to receive wireless communications from the radiotelephones over the first range of satellite band return link frequencies and to transmit wireless communications to the radiotelephones over the second range of satellite band forward link frequencies that is spaced apart from the first range, in a first mode of operation. In a second mode of operation, wireless communications are transmitted to the radiotelephones by the ancillary terrestrial component over a modified second range of satellite band forward link frequencies. In some embodiments, the modified second range of satellite band forward link frequencies is selected to reduce interference with wireless receivers that operate outside the second range of satellite band forward link frequencies, compared to operation of the ancillary terrestrial component, using the second range of satellite band forward link frequencies.

As will be described below, many embodiments of modified second ranges of satellite band forward link frequencies may be used by multiple mode ancillary terrestrial components. Moreover, the modified second ranges of satellite band forward link frequencies may be used by a single mode ancillary terrestrial component, to reduce and preferably eliminate interference by the forward link of the ancillary terrestrial component with other satellite-based systems, such as GPS/GLONASS systems. Finally, as also will be described below, in some embodiments, the multiple mode or single mode ancillary terrestrial component also is selectively configured to receive wireless communications from the radiotelephones over a modified first range of satellite band return link frequencies.

More specifically, in some embodiments, the modified second range of satellite band forward link frequencies includes only a subset of the second range of satellite band forward link frequencies, so as to provide a guard band within the second range of satellite band forward link frequencies that is not used to transmit wireless communications from the ancillary terrestrial component to the radiotelephones. In other embodiments, the modified second range of satellite band forward link frequencies includes only a subset at a low frequency portion of the second range of satellite band forward link frequencies, so as to provide a guard band at a high frequency portion of the second range of satellite band forward link frequencies that is not used to transmit wireless communications from the ancillary terrestrial component to the radiotelephones. In still other embodiments, the first range of satellite band return link frequencies is contained in the L-band of frequencies above GPS/GLONASS frequencies, and the second range of satellite band forward link frequencies is contained in the L-band of frequencies below the GPS/GLONASS frequencies. The modified second range of satellite band forward link frequencies includes only a portion of the second range of satellite band forward link frequencies that is remote from the GPS/GLONASS frequencies, so as to provide a guard band in a portion of the second range of satellite band forward link frequencies that is adjacent the GPS/GLONASS frequencies.

In other embodiments, the ancillary terrestrial component also is selectively configured to receive wireless communications from the radiotelephones over a modified first range of satellite band return link frequencies that includes at least one time division duplex frequency that is used to transmit wireless communications to the radiotelephones and to receive wireless communications from the radiotelephones at different times. In yet other embodiments, the at least one time division duplex frequency comprises a frame including a plurality of slots, where at least a first one of the slots is used to transmit wireless communications to the radiotelephones and wherein at least a second one of the slots is used to receive wireless communications from the radiotelephones. In yet other embodiments, the entire first range of satellite band return link frequencies is time division duplexed to transmit wireless communications to the radiotelephones and to receive wireless communications from the radiotelephones at different times. In still other embodiments, a first number of slots is used to transmit wireless communications to the radiotelephones, and a second number of slots is used to receive wireless communications from the radiotelephones, wherein the first number is greater than the second number. In still further embodiments, at least a first one of the slots is used to transmit wireless communications to the radiotelephones using a first modulation and/or protocol such as EDGE modulation and/or protocol, and at least a second one of the slots is used to receive wireless communications from the radiotelephones using a second modulation and/or protocol such as GPRS modulation and/or protocol, wherein the first modulation and/or protocol is more spectrally efficient than the second modulation and/or protocol.

In yet other embodiments of the invention, interference with out-of-band satellite systems, such as GPS/GLONASS, can be reduced by using a modified second range of satellite band forward link frequencies that includes a plurality of frequencies in the second range of satellite band forward frequencies that are transmitted by the ancillary terrestrial component to the radiotelephones at a power level, such as a maximum power level, that monotonically decreases as a function of frequency. In still other embodiments, only a subset of frequencies at a first or second end of the second range of satellite band forward link frequencies is transmitted at a power level, such as a maximum power level, that monotonically decreases toward the first or second end of the second range of satellite band forward link frequencies. More specifically, in some embodiments, when the first range of satellite band return link frequencies is contained in the L-band of frequencies above GPS/GLONASS frequencies and the second range of satellite band forward link frequencies is contained in the L-band of frequencies below the GPS/GLONASS frequencies, the modified second range of satellite band forward linked frequencies includes a subset of frequencies proximate to an end of the second range of satellite band forward link frequencies adjacent the GPS/GLONASS frequencies that are transmitted by the ancillary terrestrial component of the radiotelephones at a power level, such as a maximum power level, that monotonically decreases towards the end of the second range of satellite band forward link frequencies adjacent the GPS/GLONASS frequencies.

In still other embodiments, the plurality of frequencies in the second range of satellite band forward link frequencies are transmitted by the ancillary terrestrial component to the radiotelephones as a function of a distance of the respective radiotelephone from the ancillary terrestrial component and at a power level, such as a maximum power level, that monotonically decreases as a function of frequency. Thus, the lower power levels may be associated with the higher frequencies and may be used to communicate with radiotelephones that are closer to the ancillary terrestrial component and the higher power levels may be associated with the lower frequencies and may be used to communicate with radiotelephones that are further from the ancillary terrestrial component.

In other embodiments of the present invention, interference with other satellite receiver systems by the ancillary terrestrial component can be reduced or prevented by leaving at least two contiguous slots in the frame that is transmitted by the ancillary terrestrial component to the radiotelephones unoccupied. In yet other embodiments, at least three contiguous slots are left unoccupied. In still other embodiments, at least two contiguous slots in the frame are transmitted at lower power than remaining slots in the frame that is transmitted by the ancillary terrestrial component to the radiotelephones. In still further embodiments, three contiguous slots in the frame are transmitted at lower power than remaining slots in the frame that is transmitted by the ancillary terrestrial component to the radiotelephones. In still other embodiments, the at least two or three contiguous slots that are transmitted at lower power are transmitted to radiotelephones that are relatively close to the ancillary terrestrial component, whereas the remaining slots are transmitted to radiotelephones that are relatively far from the ancillary terrestrial component. In still other embodiments, only frequencies that are proximate to the first or second end of the second range of satellite band forward link frequencies are transmitted by the ancillary terrestrial component to the radiotelephones with at least two contiguous slots being unoccupied or transmitted at reduced power.

In other embodiments of the invention, a multiple mode ancillary terrestrial component is selectively configured to receive wireless communications from the radiotelephones over a first range of satellite band return link frequencies, and to transmit wireless communications to the radiotelephones over a second range of satellite band forward link frequencies that is spaced apart from the first range, in a first mode of operation. In a second mode of operation, the multiple mode ancillary terrestrial component is configured to receive wireless communications from the radiotelephones over at least a subset of the second range of satellite band forward link frequencies and to transmit wireless communications to the radiotelephones over at least a subset of the first range of satellite band return link frequencies that is spaced apart from the second range. Thus, standard and reverse frequency modes may be provided. In other embodiments, in the second mode of operation, the ancillary terrestrial component is configured to receive wireless communications from the radiotelephones over all of the second range of satellite band forward link frequencies and to transmit wireless communications to the radiotelephones over all of the first range of satellite band return link frequencies that is spaced apart from the second range. Thus, the entire forward and reverse frequency bands may be interchanged by the ancillary terrestrial component.

It will be understood by those having skill in the art that the above embodiments have been described primarily with respect to multiple mode ancillary terrestrial components. However, a single mode ancillary terrestrial component also may be provided that can only include the second modes that were described above. Moreover, some or all of the various embodiments described above may be combined in embodiments of a multiple mode or single mode ancillary terrestrial component. Also, although the embodiments described above have been described primarily with respect to ancillary terrestrial components, analogous method embodiments also may be provided. Finally, analogous multiple mode or single mode radiotelephones that can interface with a space-based component and/or with the analogous embodiments of the multiple mode or single mode ancillary terrestrial components also may be provided. Accordingly, satellite frequencies may be reused terrestrially, to allow improved reliability, capacity, cost effectiveness and/or aesthetic appeal and/or to reduce or eliminate interference with other satellite-based systems such as GPS/GLONASS.

BRIEF DESCRIPTION OF THE DRAWINGS

FIG. 8 graphically illustrates mapping of monotonically decreasing power levels to frequencies according to embodiments of the present invention.

FIG. 9 illustrates an ideal cell that is mapped to three power regions and three associated carrier frequencies according to embodiments of the invention.

FIG. 10 depicts a realistic cell that is mapped to three power regions and three associated carrier frequencies according to embodiments of the invention.

DETAILED DESCRIPTION

The present invention now will be described more fully hereinafter with reference to the accompanying drawings, in which typical embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
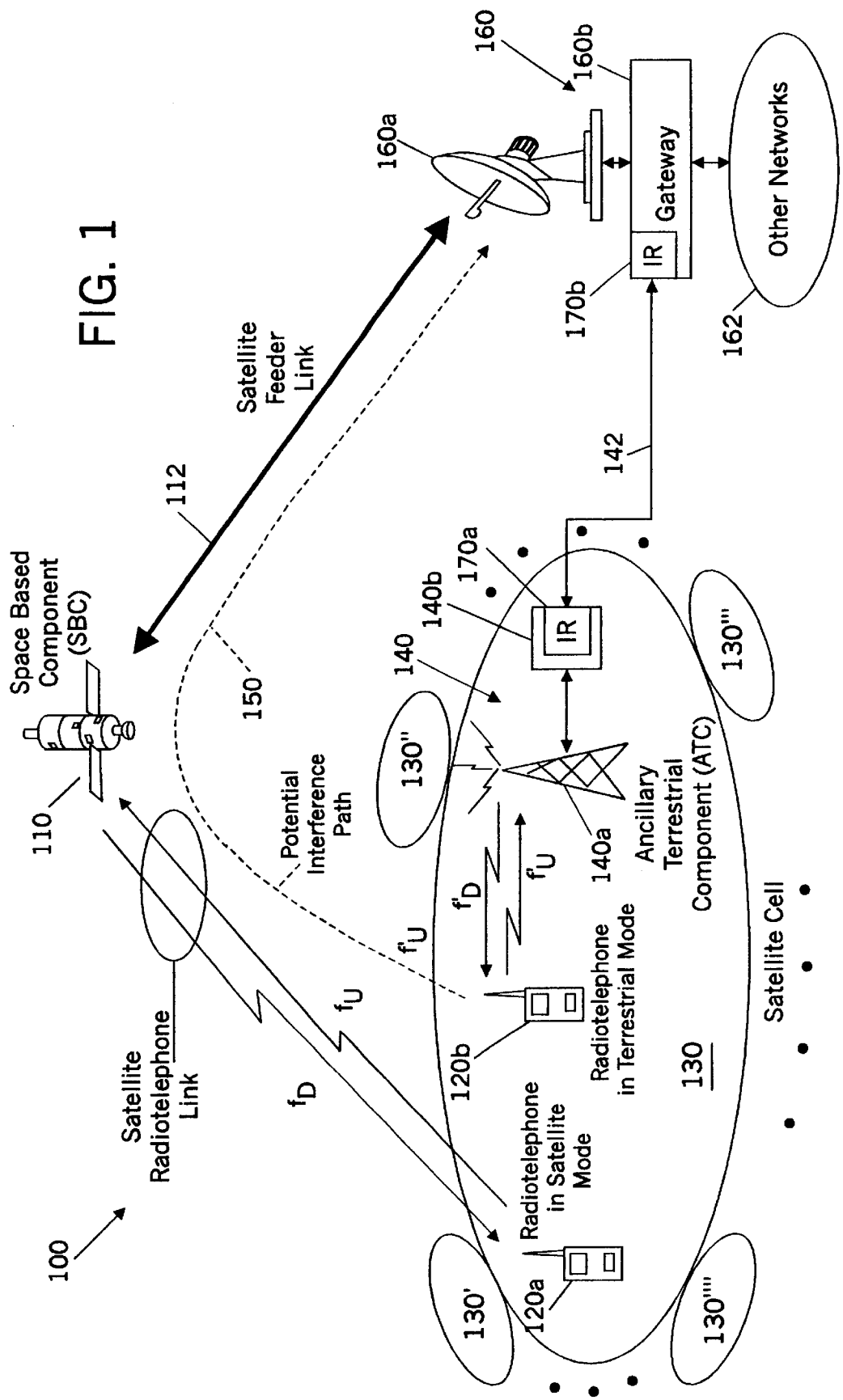
FIG. 1 is a schematic diagram of cellular radiotelephone systems and methods according to embodiments of the invention.

FIG. 1 is a schematic diagram of cellular satellite radiotelephone systems and methods according to embodiments of the invention. As shown in FIG. 1, these cellular satellite radiotelephone systems and methods 100 include at least one Space-Based Component (SBC) 110, such as a satellite. The space-based component 110 is configured to transmit wireless communications to a plurality of radiotelephones 120a, 120b in a satellite footprint comprising one or more satellite radiotelephone cells 130–130''' over one or more satellite radiotelephone forward link (downlink) frequencies $f_D$. The space-based component 110 is configured to receive wireless communications from, for example, a first radiotelephone 120a in the satellite radiotelephone cell 130 over a satellite radiotelephone return link (uplink) frequency $f_U$. An ancillary terrestrial network, comprising at least one ancillary terrestrial component 140, which may include an antenna 140a and an electronics system 140b, is configured to receive wireless communications from, for example, a second radiotelephone 120b in the radiotelephone cell 130 over the satellite radiotelephone uplink frequency, denoted $f'_U$, which may be the same as $f_U$. Thus, as illustrated in FIG. 1, radiotelephone 120a may be communicating with the space-based component 110 while radiotelephone 120b may be communicating with the ancillary terrestrial component 140. As shown in FIG. 1, the space-based component 110 also undesirably receives the wireless communications from the second radiotelephone 120b in the satellite radiotelephone cell 130 over the satellite radiotelephone frequency $f'_U$ as interference. More specifically, a potential interference path is shown at 150. In this potential interference path 150, the return link signal of the second radiotelephone 120b at carrier frequency $f'_U$ interferes with satellite communications. This interference would generally be strongest when $f'_U = f_U$, because, in that case, the same return link frequency would be used for space-based component and ancillary terrestrial component communications over the same satellite radiotelephone cell, and no spatial discrimination between satellite radiotelephone cells would appear to exist.

Still referring to FIG. 1, embodiments of satellite radiotelephone systems/methods 100 can include at least one gateway 160 that can include an antenna 160a and an electronics system 160b that can be connected to other networks 162 including terrestrial and/or other radiotelephone networks. The gateway 160 also communicates with the space-based component 110 over a satellite feeder link 112. The gateway 160 also communicates with the ancillary terrestrial component 140, generally over a terrestrial link 142.

Still referring to FIG. 1, an Interference Reducer (IR) 170a also may be provided at least partially in the ancillary terrestrial component electronics system 140b. Alternatively or additionally, an interference reducer 170b may be provided at least partially in the gateway electronics system 160b. In yet other alternatives, the interference reducer may be provided at least partially in other components of the cellular satellite system/method 100 instead of or in addition to the interference reducer 170a and/or 170b. The interference reducer is responsive to the space-based component 110 and to the ancillary terrestrial component 140, and is configured to reduce the interference from the wireless communications that are received by the space-based component 110 and is at least partially generated by the second radiotelephone 120b in the satellite radiotelephone cell 130 over the satellite radiotelephone frequency $f'_U$. The interference reducer 170a and/or 170b uses the wireless communications $f'_U$ that are intended for the ancillary terrestrial component 140 from the second radiotelephone 120b in the satellite radiotelephone cell 130 using the satellite radiotelephone frequency $f'_U$ to communicate with the ancillary terrestrial component 140.

In embodiments of the invention, as shown in FIG. 1, the ancillary terrestrial component 140 generally is closer to the first and second radiotelephones 120a and 120b, respectively, than is the space-based component 110, such that the wireless communications from the second radiotelephone 120b are received by the ancillary terrestrial component 140 prior to being received by the space-based component 110. The interference reducer 170a and/or 170b is configured to generate an interference cancellation signal comprising, for example, at least one delayed replica of the wireless communications from the second radiotelephone 120b that are received by the ancillary terrestrial component 140, and to subtract the delayed replica of the wireless communications from the second radiotelephone 120b that are received by the ancillary terrestrial component 140 from the wireless communications that are received from the space-based component 110. The interference reduction signal may be transmitted from the ancillary terrestrial component 140 to the gateway 160 over link 142 and/or using other conventional techniques.

Thus, adaptive interference reduction techniques may be used to at least partially cancel the interfering signal, so that the same, or other nearby, satellite radiotelephone uplink frequency can be used in a given cell for communications by radiotelephones 120 with the satellite 110 and with the ancillary terrestrial component 140. Accordingly, all frequencies that are assigned to a given cell 130 may be used for both radiotelephone 120 communications with the space-based component 110 and with the ancillary terrestrial component 140. Conventional systems may avoid terrestrial reuse of frequencies within a given satellite cell that are being used within the satellite cell for satellite communications. Stated differently, conventionally, only frequencies used by other satellite cells may be candidates for terrestrial reuse within a given satellite cell. Beam-to-beam spatial isolation that is provided by the satellite system was relied upon to reduce or minimize the level of interference from the terrestrial operations into the satellite operations. In sharp contrast, embodiments of the invention can use an interference reducer to allow all frequencies assigned to a satellite cell to be used terrestrially and for satellite radiotelephone communications.

Embodiments of the invention according to FIG. 1 may arise from a realization that the return link signal from the second radiotelephone 120b at f'$_U$ generally will be received and processed by the ancillary terrestrial component 140 much earlier relative to the time when it will arrive at the satellite gateway 160 from the space-based component 110 via the interference path 150. Accordingly, the interference signal at the satellite gateway 160b can be at least partially canceled. Thus, as shown in FIG. 1, an interference cancellation signal, such as the demodulated ancillary terrestrial component signal, can be sent to the satellite gateway 160b by the interference reducer 170a in the ancillary terrestrial component 140, for example using link 142. In the interference reducer 170b at the gateway 160b, a weighted (in amplitude and/or phase) replica of the signal may be formed using, for example, adaptive transversal filter techniques that are well known to those having skill in the art. Then, a transversal filter output signal is subtracted from the aggregate received satellite signal at frequency f$_U$ that contains desired as well as interference signals. Thus, the interference cancellation need not degrade the signal-to-noise ratio of the desired signal at the gateway 160, because a regenerated (noise-free) terrestrial signal, for example as regenerated by the ancillary terrestrial component 140, can be used to perform interference suppression.

Figure 2:
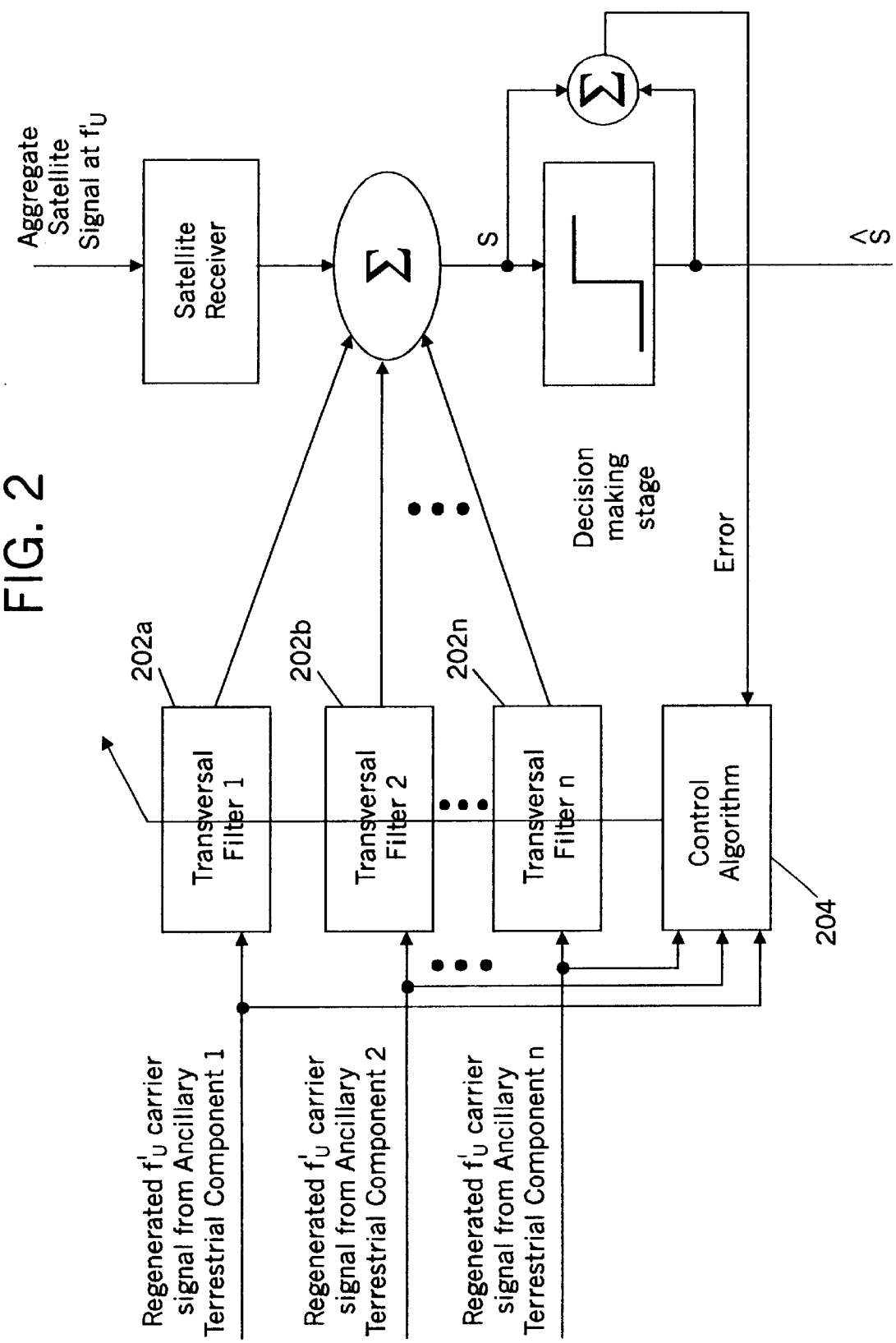
FIG. 2 is a block diagram of adaptive interference reducers according to embodiments of the present invention.

FIG. 2 is a block diagram of embodiments of adaptive interference cancellers that may be located in the ancillary terrestrial component 140, in the gateway 160, and/or in another component of the cellular radiotelephone system 100. As shown in FIG. 2, one or more control algorithms 204, known to those having skill in the art, may be used to adaptively adjust the coefficients of a plurality of transversal filters 202a–202n. Adaptive algorithms, such as Least Mean Square Error (LMSE), Kalman, Fast Kalman, Zero Forcing and/or various combinations thereof or other techniques may be used. It will be understood by those having skill in the art that the architecture of FIG. 2 may be used with an LMSE algorithm. However, it also will be understood by those having skill in the art that conventional architectural modifications may be made to facilitate other control algorithms.

Figure 3:
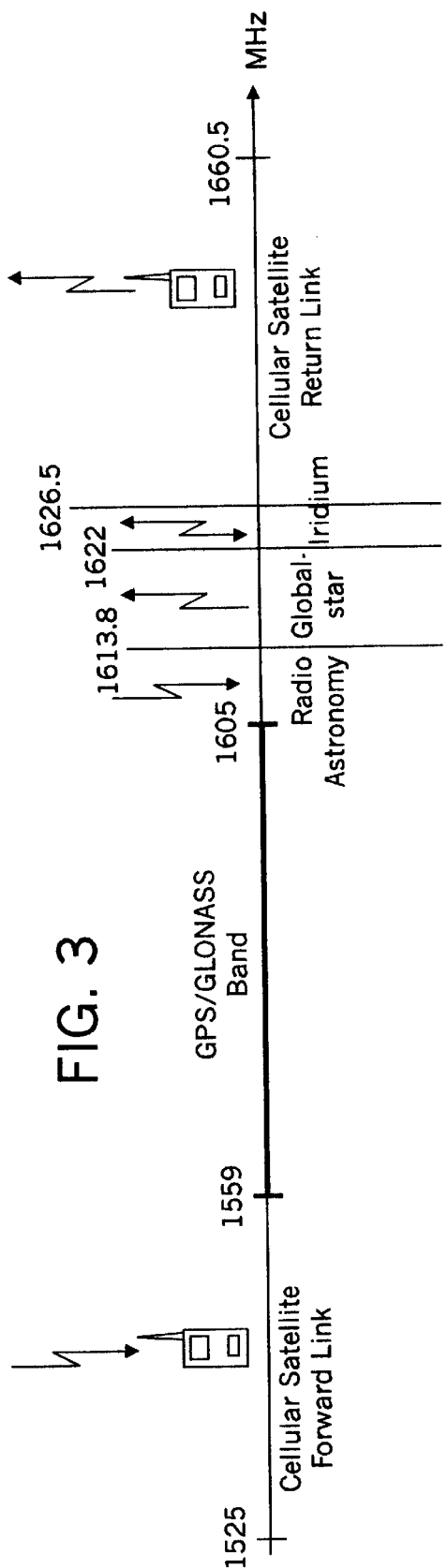
FIG. 3 is a spectrum diagram that illustrates satellite L-band frequency allocations.

Additional embodiments of the invention now will be described with reference to FIG. 3, which illustrates L-band frequency allocations including cellular radiotelephone system forward links and return links. As shown in FIG. 3, the space-to-ground L-band forward link (downlink) frequencies are assigned from 1525 MHz to 1559 MHz. The ground-to-space L-band return link (uplink) frequencies occupy the band from 1626.5 MHz to 1660.5 MHz. Between the forward and return L-band links lie the GPS/GLONASS radionavigation band (from 1559 MHz to 1605 MHz).

In the detailed description to follow, GPS/GLONASS will be referred to simply as GPS for the sake of brevity. Moreover, the acronyms ATC and SBC will be used for the ancillary terrestrial component and the space-based component, respectively, for the sake of brevity.

As is known to those skilled in the art, GPS receivers may be extremely sensitive since they are designed to operate on very weak spread-spectrum radionavigation signals that arrive on the earth from a GPS satellite constellation. As a result, GPS receivers may to be highly susceptible to in-band interference. ATCs that are configured to radiate L-band frequencies in the forward satellite band (1525 to 1559 MHz) can be designed with very sharp out-of-band emissions filters to satisfy the stringent out-of-band spurious emissions desires of GPS.

Referring again to FIG. 1, some embodiments of the invention can provide systems and methods that can allow an ATC 140 to configure itself in one of at least two modes. In accordance with a first mode, which may be a standard mode and may provide highest capacity, the ATC 140 transmits to the radiotelephones 120 over the frequency range from 1525 MHz to 1559 MHz, and receives transmissions from the radiotelephones 120 in the frequency range from 1626.5 MHz to 1660.5 MHz, as illustrated in FIG. 3. In contrast, in a second mode of operation, the ATC 140 transmits wireless communications to the radiotelephones 120 over a modified range of satellite band forward link (downlink) frequencies. The modified range of satellite band forward link frequencies may be selected to reduce, compared to the unmodified range of satellite band forward link frequencies, interference with wireless receivers such as GPS receivers that operate outside the range of satellite band forward link frequencies.

Many modified ranges of satellite band forward link frequencies may be provided according to embodiments of the present invention. In some embodiments, the modified range of satellite band forward link frequencies can be limited to a subset of the original range of satellite band forward link frequencies, so as to provide a guard band of unused satellite band forward link frequencies. In other embodiments, all of the satellite band forward link frequencies are used, but the wireless communications to the radiotelephones are modified in a manner to reduce interference with wireless receivers that operate outside the range of satellite band forward link frequencies. Combinations and subcombinations of these and/or other techniques also may be used, as will be described below.

It also will be understood that embodiments of the invention that will now be described in connection with FIGS. 4–12 will be described in terms of multiple mode ATCs 140 that can operate in a first standard mode using the standard forward and return links of FIG. 3, and in a second or alternate mode that uses a modified range of satellite band forward link frequencies and/or a modified range of satellite band return link frequencies. These multiple mode ATCs can operate in the second, nonstandard mode, as long as desirable, and can be switched to standard mode otherwise. However, other embodiments of the present invention need not provide multiple mode ATCs but, rather, can provide ATCs that operate using the modified range of satellite band forward link and/or return link frequencies.

Embodiments of the invention now will be described, wherein an ATC operates with an SBC that is configured to receive wireless communications from radiotelephones over a first range of satellite band return link frequencies and to transmit wireless communications to the radiotelephones over a second range of satellite band forward link frequencies that is spaced apart from the first range. According to these embodiments, the ATC is configured to use at least one time division duplex frequency to transmit wireless communications to the radiotelephones and to receive wireless communications from the radiotelephones at different times. In particular, in some embodiments, the at least one time division duplex frequency that is used to transmit wireless communications to the radiotelephones and to receive wireless communications from the radiotelephones at different times, comprises a frame including a plurality of slots. At least a first one of the slots is used to transmit wireless communications to the radiotelephones and at least a second one of the slots is used to receive wireless communications from the radiotelephones. Thus, in some embodiments, the ATC transmits and receives, in Time Division Duplex (TDD) mode, using frequencies from 1626.5 MHz to 1660.5 MHz. In some embodiments, all ATCs across the entire network may have the stated configuration/reconfiguration flexibility. In other embodiments, only some ATCs may be reconfigurable.

Figure 5:
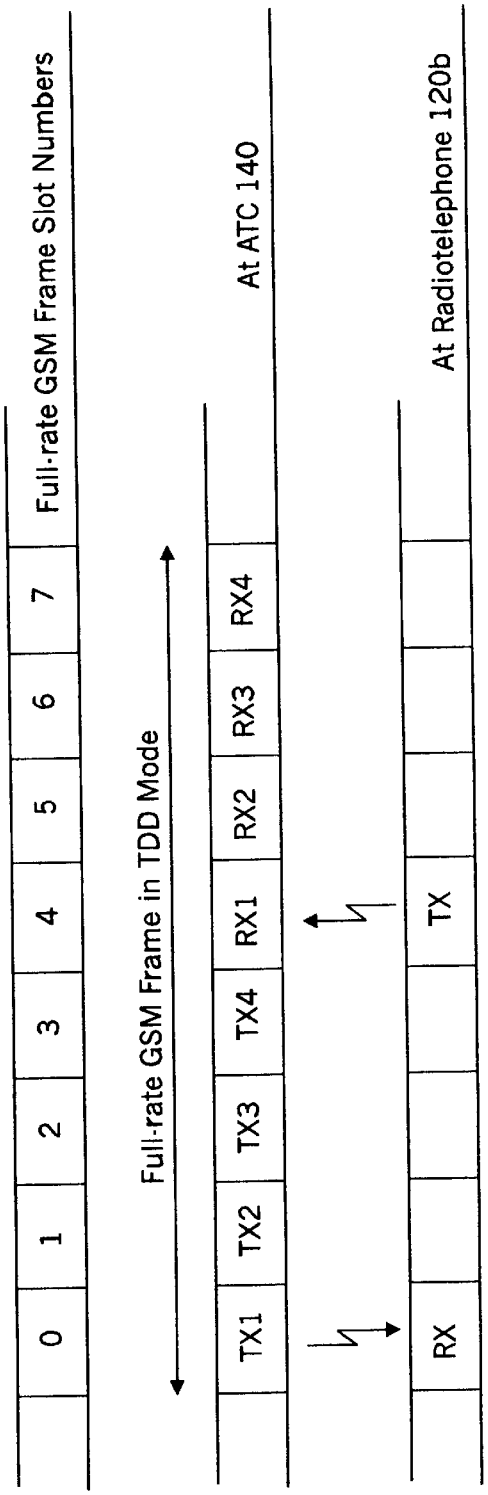
FIG. 5 illustrates time division duplex frame structures according to embodiments of the present invention.
Figure 4:
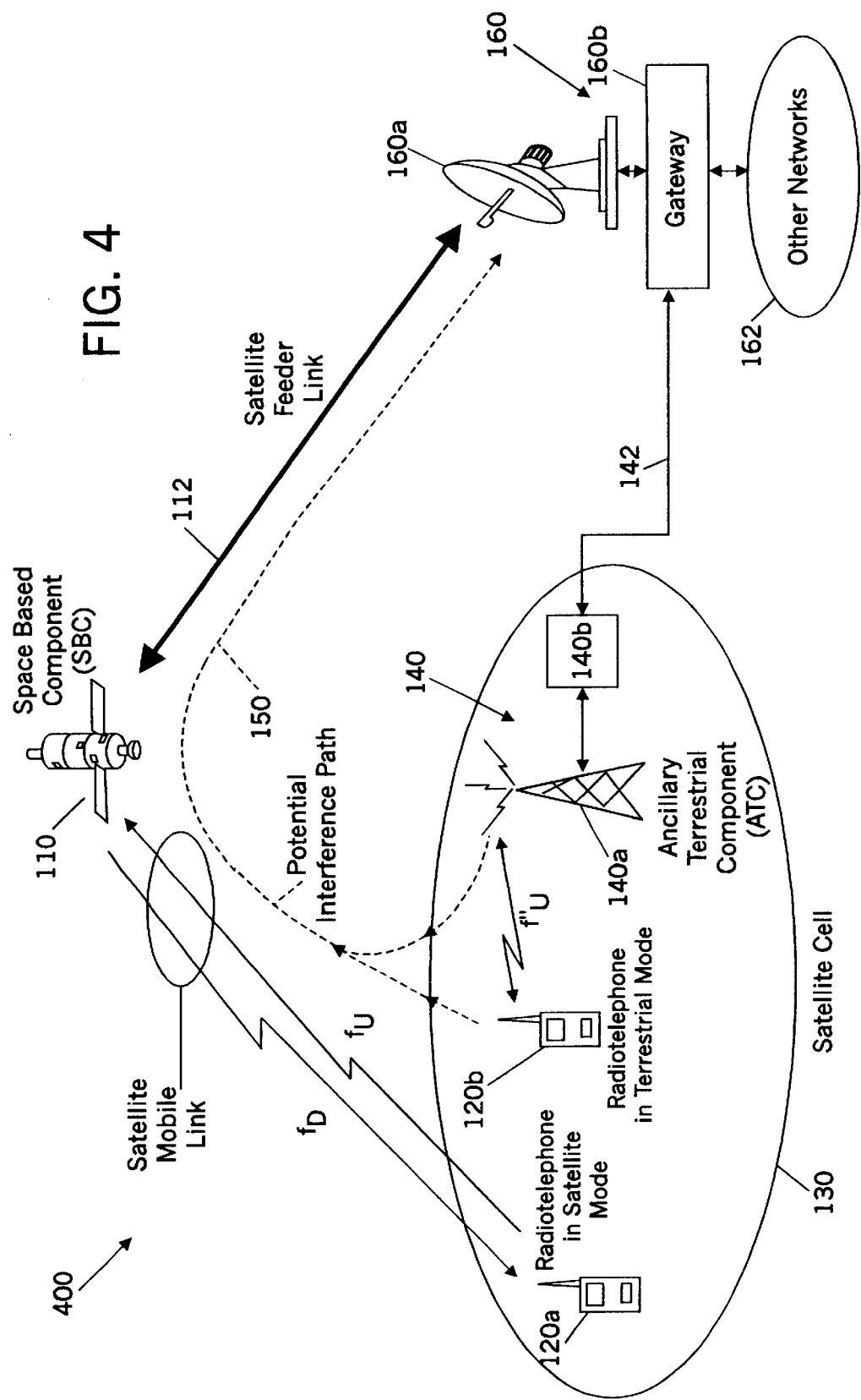
FIG. 4 is a schematic diagram of cellular satellite systems and methods according to other embodiments of the present invention.

FIG. 4 illustrates satellite systems and methods 400 according to some embodiments of the invention, including an ATC 140 communicating with a radiotelephone 120b using a carrier frequency $f''_U$ in TDD mode. FIG. 5 illustrates an embodiment of a TDD frame structure. Assuming full-rate GSM (eight time slots per frame), up to four full-duplex voice circuits can be supported by one TDD carrier. As shown in FIG. 5, the ATC 140 transmits to the radiotelephone 120b over, for example, time slot number 0. The radiotelephone 120b receives and replies back to the ATC 140 over, for example, time slot number 4. Time slots number 1 and 5 may be used to establish communications with another radiotelephone, and so on.

A Broadcast Control CHannel (BCCH) is preferably transmitted from the ATC 140 in standard mode, using a carrier frequency from below any guard band exclusion region. In other embodiments, a BCCH also can be defined using a TDD carrier. In any of these embodiments, radiotelephones in idle mode can, per established GSM methodology, monitor the BCCH and receive system-level and paging information. When a radiotelephone is paged, the system decides what type of resource to allocate to the radiotelephone in order to establish the communications link. Whatever type of resource is allocated for the radiotelephone communications channel (TDD mode or standard mode), the information is communicated to the radiotelephone, for example as part of the call initialization routine, and the radiotelephone configures itself appropriately.

It may be difficult for the TDD mode to co-exist with the standard mode over the same ATC, due, for example, to the ATC receiver LNA stage. In particular, assuming a mixture of standard and TDD mode GSM carriers over the same ATC, during the part of the frame when the TDD carriers are used to serve the forward link (when the ATC is transmitting TDD) enough energy may leak into the receiver front end of the same ATC to desensitize its LNA stage.

Techniques can be used to suppress the transmitted ATC energy over the 1600 MHz portion of the band from desensitizing the ATC's receiver LNA, and thereby allow mixed standard mode and TDD frames. For example, isolation between outbound and inbound ATC front ends and/or antenna system return loss may be increased or maximized. A switchable band-reject filter may be placed in front of the LNA stage. This filter would be switched in the receiver chain (prior to the LNA) during the part of the frame when the ATC is transmitting TDD, and switched out during the rest of the time. An adaptive interference canceller can be configured at RF (prior to the LNA stage). If such techniques are used, suppression of the order of 70 dB can be attained, which may allow mixed standard mode and TDD frames. However, the ATC complexity and/or cost may increase.

Thus, even though ATC LNA desensitization may be reduced or eliminated, it may use significant special engineering and attention and may not be economically worth the effort. Other embodiments, therefore, may keep TDD ATCs pure TDD, with the exception, perhaps, of the BCCH carrier which may not be used for traffic but only for broadcasting over the first part of the frame, consistent with TDD protocol. Moreover, Random Access CHannel (RACH) bursts may be timed so that they arrive at the ATC during the second half of the TDD frame. In some embodiments, all TDD ATCs may be equipped to enable reconfiguration in response to a command.

It is well recognized that during data communications or other applications, the forward link may use transmissions at higher rates than the return link. For example, in web browsing with a radiotelephone, mouse clicks and/or other user selections typically are transmitted from the radiotelephone to the system. The system, however, in response to a user selection, may have to send large data files to the radiotelephone. Hence, other embodiments of the invention may be configured to enable use of an increased or maximum number of time slots per forward GSM carrier frame, to provide a higher downlink data rate to the radiotelephones.

Thus, when a carrier frequency is configured to provide service in TDD mode, a decision may be made as to how many slots will be allocated to serving the forward link, and how many will be dedicated to the return link. Whatever the decision is, it may be desirable that it be adhered to by all TDD carriers used by the ATC, in order to reduce or avoid the LNA desensitization problem described earlier. In voice communications, the partition between forward and return link slots may be made in the middle of the frame as voice activity typically is statistically bidirectionally symmetrical. Hence, driven by voice, the center of the frame may be where the TDD partition is drawn.

To increase or maximize forward link throughput in data mode, data mode TDD carriers according to embodiments of the invention may use a more spectrally efficient modulation and/or protocol, such as the EDGE modulation and/or protocol, on the forward link slots. The return link slots may be based on a less spectrally efficient modulation and/or protocol such as the GPRS (GMSK) modulation and/or protocol. The EDGE modulation/protocol and the GPRS modulation/protocol are well known to those having skill in the art, and need not be described further herein. Given an EDGE forward/GPRS return TDD carrier strategy, up to (384/2)=192 kbps may be supported on the forward link while on the return link the radiotelephone may transmit at up to (115/2)≈64 kbps.

In other embodiments, it also is possible to allocate six time slots of an eight-slot frame for the forward link and only two for the return link. In these embodiments, for voice services, given the statistically symmetric nature of voice, the return link vocoder may need to be comparable with quarter-rate GSM, while the forward link vocoder can operate at full-rate GSM, to yield six full-duplex voice circuits per GSM TDD-mode carrier (a voice capacity penalty of 25%). Subject to this non-symmetrical partitioning strategy, data rates of up to (384)(6/8)=288 kbps may be achieved on the forward link, with up to (115)(2/8)≈32 kbps on the return link.

Figure 6:
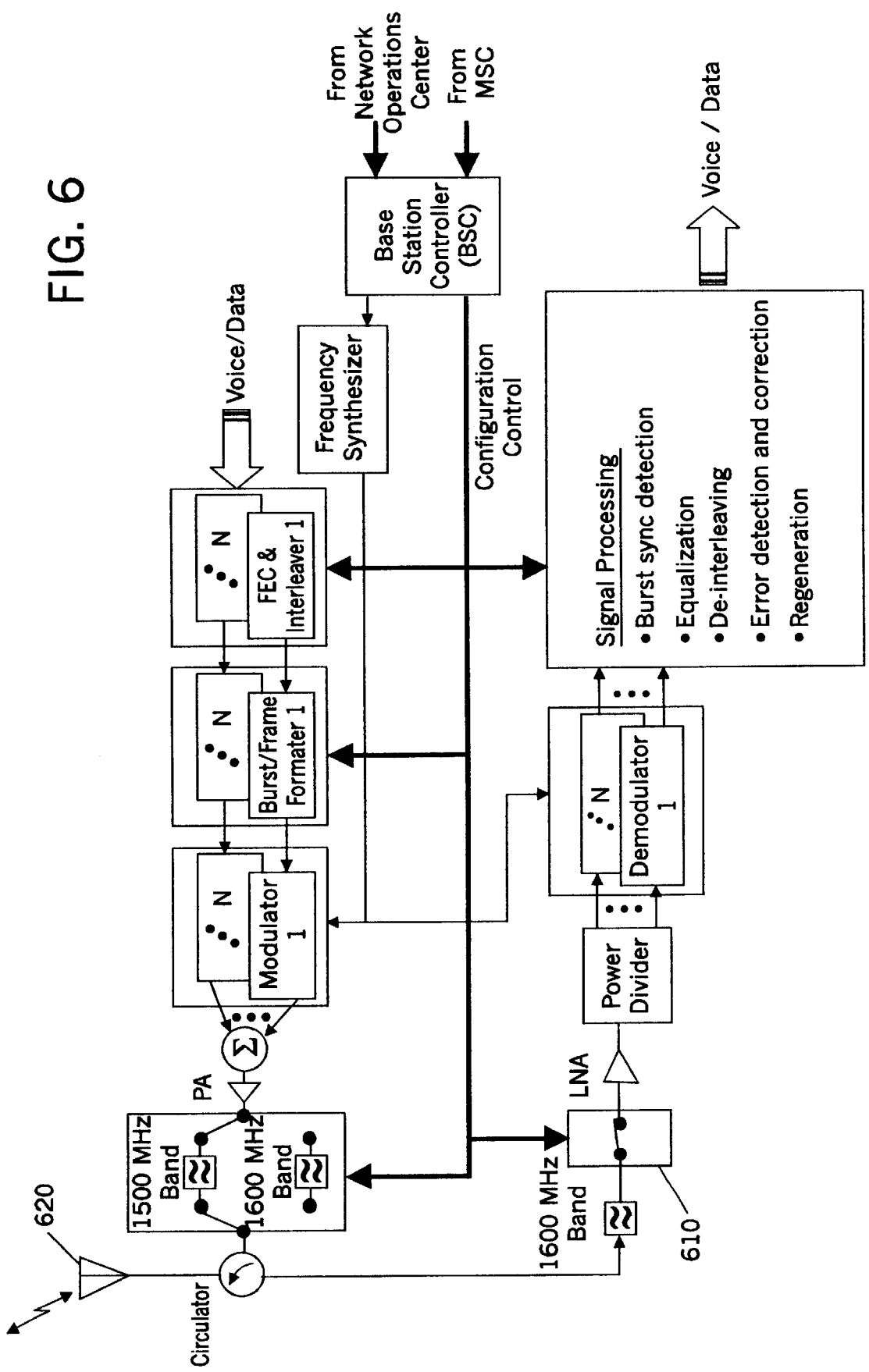
FIG. 6 is a block diagram of architectures of ancillary terrestrial components according to embodiments of the invention.

FIG. 6 depicts an ATC architecture according to embodiments of the invention, which can lend itself to automatic configuration between the two modes of standard GSM and TDD GSM on command, for example, from a Network Operations Center (NOC) via a Base Station Controller (BSC). It will be understood that in these embodiments, an antenna 620 can correspond to the antenna 140a of FIGS. 1 and 4, and the remainder of FIG. 6 can correspond to the electronics system 140b of FIGS. 1 and 4. If a reconfiguration command for a particular carrier, or set of carriers, occurs while the carrier(s) are active and are supporting traffic, then, via the in-band signaling Fast Associated Control CHannel (FACCH), all affected radiotelephones may be notified to also reconfigure themselves and/or switch over to new resources. If carrier(s) are reconfigured from TDD mode to standard mode, automatic reassignment of the carrier(s) to the appropriate standard-mode ATCs, based, for example, on capacity demand and/or reuse pattern can be initiated by the NOC. If, on the other hand, carrier(s) are reconfigured from standard mode to TDD mode, automatic reassignment to the appropriate TDD-mode ATCs can take place on command from the NOC.

Still referring to FIG. 6, a switch 610 may remain closed when carriers are to be demodulated in the standard mode. In TDD mode, this switch 610 may be open during the first half of the frame, when the ATC is transmitting, and closed during the second half of the frame, when the ATC is receiving. Other embodiments also may be provided.

FIG. 6 assumes N transceivers per ATC sector, where N can be as small as one, since a minimum of one carrier per sector generally is desired. Each transceiver is assumed to operate over one GSM carrier pair (when in standard mode) and can thus support up to eight full-duplex voice circuits, neglecting BCCH channel overhead. Moreover, a standard GSM carrier pair can support sixteen full-duplex voice circuits when in half-rate GSM mode, and up to thirty two full-duplex voice circuits when in quarter-rate GSM mode.

Figure 7:
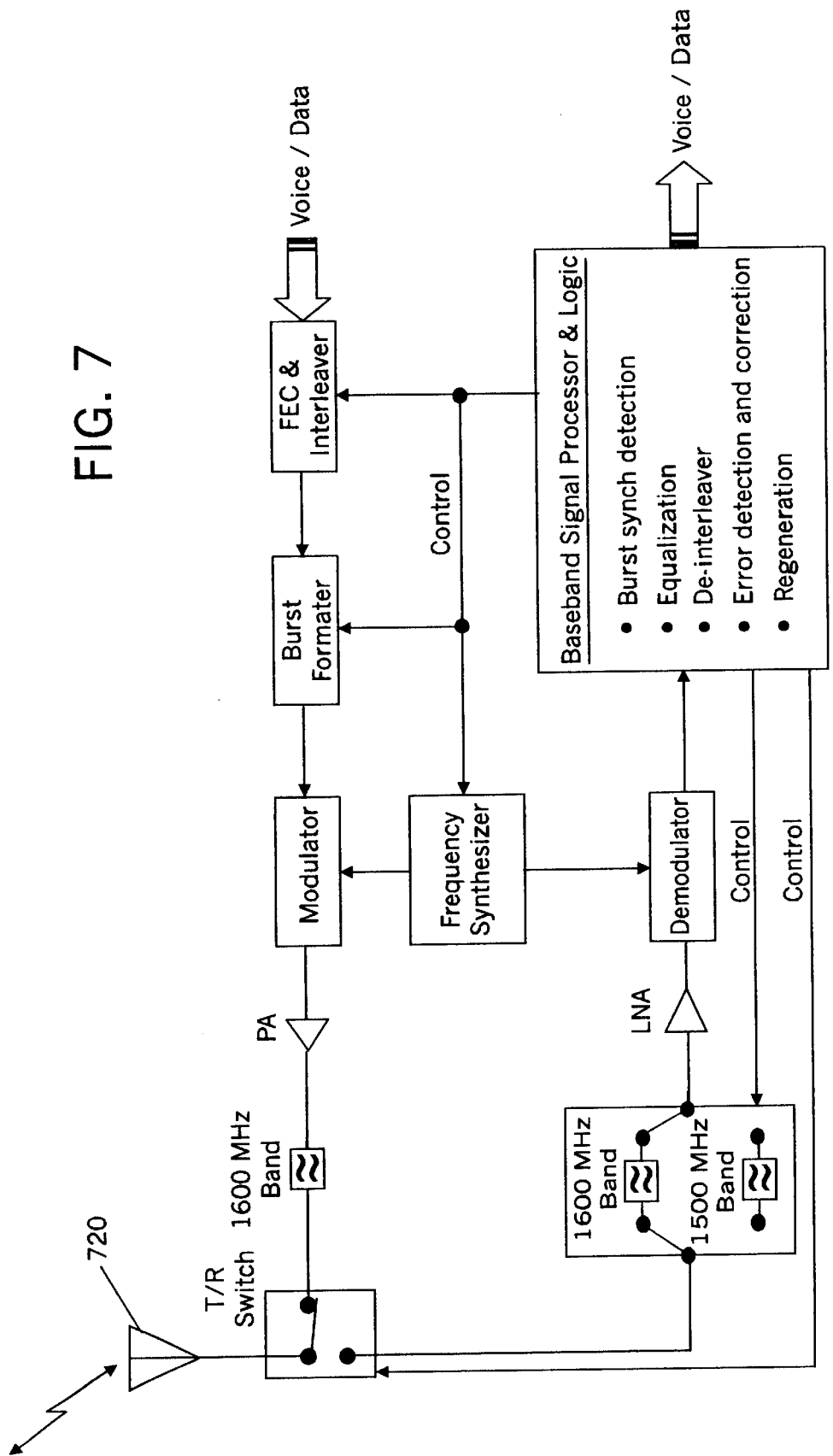
FIG. 7 is a block diagram of architectures of reconfigurable radiotelephones according to embodiments of the invention.

When in TDD mode, the number of full duplex voice circuits may be reduced by a factor of two, assuming the same vocoder. However, in TDD mode, voice service can be offered via the half-rate GSM vocoder with almost imperceptible quality degradation, in order to maintain invariant voice capacity. FIG. 7 is a block diagram of a reconfigurable radiotelephone architecture that can communicate with a reconfigurable ATC architecture of FIG. 6. In FIG. 7, an antenna 720 is provided, and the remainder of FIG. 7 can provide embodiments of an electronics system for the radiotelephone.

It will be understood that the ability to reconfigure ATCs and radiotelephones according to embodiments of the invention may be obtained at a relatively small increase in cost. The cost may be mostly in Non-Recurring Engineering (NRE) cost to develop software. Some recurring cost may also be incurred, however, in that at least an additional RF filter and a few electronically controlled switches may be used per ATC and radiotelephone. All other hardware/software can be common to standard-mode and TDD-mode GSM.

Referring now to FIG. 8, other radiotelephone systems and methods according to embodiments of the invention now will be described. In these embodiments, the modified second range of satellite band forward link frequencies includes a plurality of frequencies in the second range of satellite band forward link frequencies that are transmitted by the ATCs to the radiotelephones at a power level, such as maximum power level, that monotonically decreases as a function of (increasing) frequency. More specifically, as will be described below, in some embodiments, the modified second range of satellite band forward link frequencies includes a subset of frequencies proximate to a first or second end of the range of satellite band forward link frequencies that are transmitted by the ATC to the radiotelephones at a power level, such as a maximum power level, that monotonically decreases toward the first or second end of the second range of satellite band forward link frequencies. In still other embodiments, the first range of satellite band return link frequencies is contained in an L-band of satellite frequencies above GPS frequencies and the second range of satellite band forward link frequencies is contained in the L-band of satellite frequencies below the GPS frequencies. The modified second range of satellite band forward link frequencies includes a subset of frequencies proximate to an end of the second range of satellite band forward link frequencies adjacent the GPS frequencies that are transmitted by the ATC to the radiotelephones at a power level, such as a maximum power level, that monotonically decreases toward the end of the second range of satellite band forward link frequencies adjacent the GPS frequencies.

Without being bound by any theory of operation, a theoretical discussion of the mapping of ATC maximum power levels to carrier frequencies according to embodiments of the present invention now will be described.

Referring to FIG. 8, let $v=\mathcal{F}(\rho)$ represent a mapping from the power ($\rho$) domain to the frequency ($v$) range. The power ($\rho$) is the power that an ATC uses or should transmit in order to reliably communicate with a given radiotelephone. This power may depend on many factors such as the radiotelephone's distance from the ATC, the blockage between the radiotelephone and the ATC, the level of multipath fading in the channel, etc., and as a result, will, in general, change as a function of time. Hence, the power used generally is determined adaptively (iteratively) via closed-loop power control, between the radiotelephone and ATC.

The frequency ($v$) is the satellite carrier frequency that the ATC uses to communicate with the radiotelephone. According to embodiments of the invention, the mapping $\mathcal{F}$ is a monotonically decreasing function of the independent variable $\rho$. Consequently, in some embodiments, as the maximum ATC power increases, the carrier frequency that the ATC uses to establish and/or maintain the communications link decreases. FIG. 8 illustrates an embodiment of a piecewise continuous monotonically decreasing (stair-case) function. Other monotonic functions may be used, including linear and/or nonlinear, constant and/or variable decreases. FACCH or Slow Associated Control CHannel (SACCH) messaging may be used in embodiments of the invention to facilitate the mapping adaptively and in substantially real time.

FIG. 9 depicts an ideal cell according to embodiments of the invention, where, for illustration purposes, three power regions and three associated carrier frequencies (or carrier frequency sets) are being used to partition a cell. For simplicity, one ATC transmitter at the center of the idealized cell is assumed with no sectorization. In embodiments of FIG. 9, the frequency (or frequency set) $f_I$ is taken from substantially the upper-most portion of the L-band forward link frequency set, for example from substantially close to 1559 MHz (see FIG. 3). Correspondingly, the frequency (or frequency set) $f_M$ is taken from substantially the central portion of the L-band forward link frequency set (see FIG. 3). In concert with the above, the frequency (or frequency set) $f_O$ is taken from substantially the lowest portion of the L-band forward link frequencies, for example close to 1525 MHz (see FIG. 3).

Thus, according to embodiments of FIG. 9, if a radiotelephone is being served within the outer-most ring of the cell, that radiotelephone is being served via frequency $f_O$. This radiotelephone, being within the furthest area from the ATC, has (presumably) requested maximum (or near maximum) power output from the ATC. In response to the maximum (or near maximum) output power request, the ATC uses its a priori knowledge of power-to-frequency mapping, such as a three-step staircase function of FIG. 9. Thus, the ATC serves the radiotelephone with a low-value frequency taken from the lowest portion of the mobile L-band forward link frequency set, for example, from as close to 1525 MHz as possible. This, then, can provide additional safeguard to any GPS receiver unit that may be in the vicinity of the ATC.

Embodiments of FIG. 9 may be regarded as idealized because they associate concentric ring areas with carrier frequencies (or carrier frequency sets) used by an ATC to serve its area. In reality, concentric ring areas generally will not be the case. For example, a radiotelephone can be close to the ATC that is serving it, but with significant blockage between the radiotelephone and the ATC due to a building. This radiotelephone, even though relatively close to the ATC, may also request maximum (or near maximum) output power from the ATC. With this in mind, FIG. 10 may depict a more realistic set of area contours that may be associated with the frequencies being used by the ATC to serve its territory, according to embodiments of the invention. The frequency (or frequency set) $f_I$ may be reused in the immediately adjacent ATC cells owing to the limited geographical span associated with $f_I$ relative to the distance between cell centers. This may also hold for $f_M$.

Figure 11:
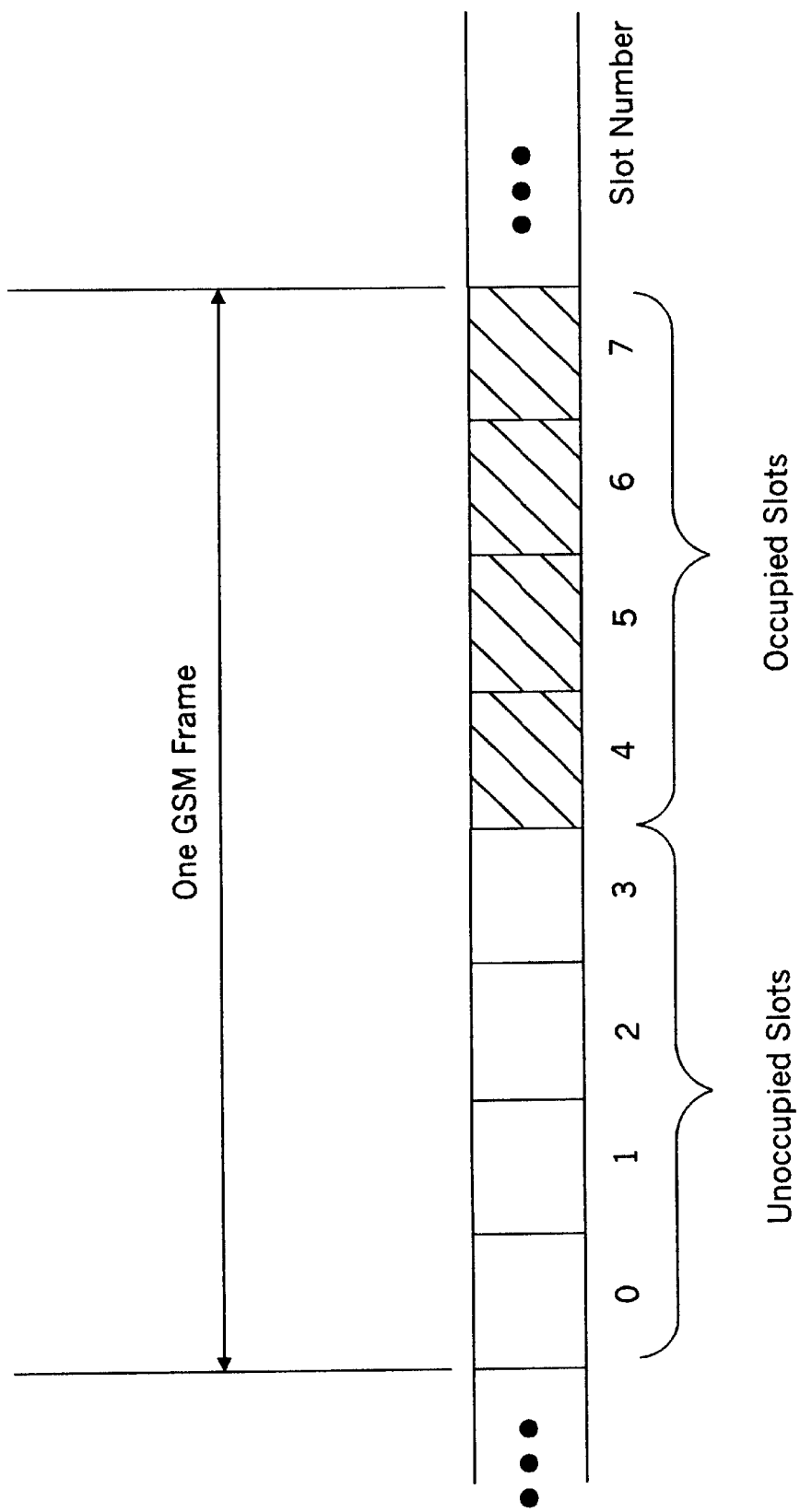
FIG. 11 illustrates two or more contiguous slots in a frame that are unoccupied according to embodiments of the present invention.

Referring now to FIG. 11, other modified second ranges of satellite band forward link frequencies that can be used by ATCs according to embodiments of the present invention now will be described. In these embodiments, at least one frequency in the modified second range of satellite band forward link frequencies that is transmitted by the ATC to the radiotelephones comprises a frame including a plurality of slots. In these embodiments, at least two contiguous slots in the frame that is transmitted by the ATC to the radiotelephones are left unoccupied. In other embodiments, three contiguous slots in the frame that is transmitted by the ATC to the radiotelephones are left unoccupied. In yet other embodiments, at least two contiguous slots in the frame that is transmitted by the ATC to the radiotelephones are transmitted at lower power than remaining slots in the frame. In still other embodiments, three contiguous slots in the frame that is transmitted by the ATC to the radiotelephones are transmitted at lower power than remaining slots in the frame. In yet other embodiments, the lower power slots may be used with first selected ones of the radiotelephones that are relatively close to the ATC and/or are experiencing relatively small signal blockage, and the remaining slots are transmitted at higher power to second selected ones of the radiotelephones that are relatively far from the ATC and/or are experiencing relatively high signal blockage.

Stated differently, in accordance with some embodiments of the invention, only a portion of the TDMA frame is utilized. For example, only the first four (or last four, or any contiguous four) time slots of a full-rate GSM frame are used to support traffic. The remaining slots are left unoccupied (empty). In these embodiments, capacity may be lost. However, as has been described previously, for voice services, half-rate and even quarter-rate GSM may be invoked to gain capacity back, with some potential degradation in voice quality. The slots that are not utilized preferably are contiguous, such as slots 0 through 3 or 4 through 7 (or 2 through 5, etc.). The use of non-contiguous slots such as 0, 2, 4, and 6, for example, may be less desirable. FIG. 11 illustrates four slots (4–7) being used and four contiguous slots (0–3) being empty in a GSM frame.

It has been found experimentally, according to these embodiments of the invention, that GPS receivers can perform significantly better when the interval between interference bursts is increased or maximized. Without being bound by any theory of operation, this effect may be due to the relationship between the code repetition period of the GPS C/A code (1 msec.) and the GSM burst duration (about 0.577 msec.). With a GSM frame occupancy comprising alternate slots, each GPS signal code period can experience at least one "hit", whereas a GSM frame occupancy comprising four to five contiguous slots allows the GPS receiver to derive sufficient clean information so as to "flywheel" through the error events.

According to other embodiments of the invention, embodiments of FIGS. 8–10 can be combined with embodiments of FIG. 11. Furthermore, according to other embodiments of the invention, if an $f_I$ carrier of FIG. 9 or 10 is underutilized, because of the relatively small footprint of the inner-most region of the cell, it may be used to support additional traffic over the much larger outermost region of the cell.

Figure 12:
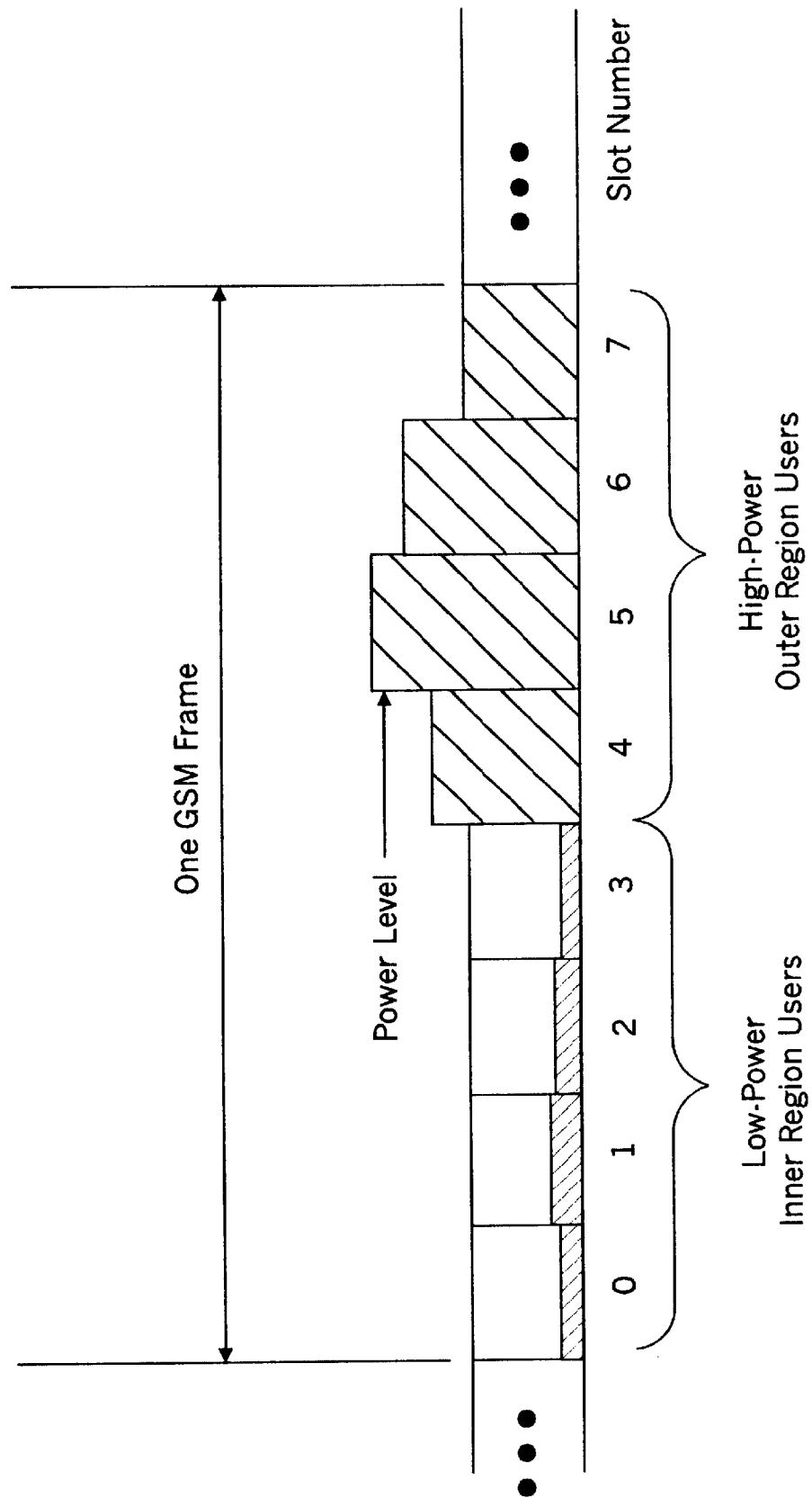
FIG. 12 illustrates loading of two or more contiguous slots with lower power transmissions according to embodiments of the present invention.

Thus, for example, assume that only the first four slots in each frame of $f_I$ are being used for inner region traffic. In embodiments of FIGS. 8–10, these four $f_I$ slots are carrying relatively low power bursts, for example of the order of 100 mW or less, and may, therefore, appear as (almost) unoccupied from an interference point of view. Loading the remaining four (contiguous) time slots of $f_I$ with relatively high-power bursts may have negligible effect on a GPS receiver because the GPS receiver would continue to operate reliably based on the benign contiguous time interval occupied by the four low-power GSM bursts. FIG. 12 illustrates embodiments of a frame at carrier $f_I$ supporting four low-power (inner interval) users and four high-power (outer interval) users. In fact, embodiments illustrated in FIG. 12 may be a preferred strategy for the set of available carrier frequencies that are closest to the GPS band. These embodiments may avoid undue capacity loss by more fully loading the carrier frequencies.

The experimental finding that interference from GSM carriers can be relatively benign to GPS receivers provided that no more than, for example, 5 slots per 8 slot GSM frame are used in a contiguous fashion can be very useful. It can be particularly useful since this experimental finding may hold even when the GSM carrier frequency is brought very close to the GPS band (as close as 1558.5 MHz) and the power level is set relatively high. For example, with five contiguous time slots per frame populated, the worst-case measured GPS receiver may attain at least 30 dB of desensitization margin, over the entire ATC service area, even when the ATC is radiating at 1558.5 MHz. With four contiguous time slots per frame populated, an additional 10 dB desensitization margin may be gained for a total of 40 dB for the worst-case measured GPS receiver, even when the ATC is radiating at 1558.5 MHz.

There still may be concern about the potential loss in network capacity (especially in data mode) that may be incurred over the frequency interval where embodiments of FIG. 11 are used to underpopulate the frame. Moreover, even though embodiments of FIG. 12 can avoid capacity loss by fully loading the carrier, they may do so subject to the constraint of filling up the frame with both low-power and high-power users. Moreover, if forward link carriers are limited to 5 contiguous high power slots per frame, the maximum forward link data rate per carrier that may be aimed at a particular user may become proportionately less.

Therefore, in other embodiments, carriers which are subject to contiguous empty/low power slots are not used for the forward link. Instead, they are used for the return link. Consequently, in some embodiments, at least part of the ATC is configured in reverse frequency mode compared to the SBC in order to allow maximum data rates over the forward link throughout the entire network. On the reverse frequency return link, a radiotelephone may be limited to a maximum of 5 slots per frame, which can be adequate for the return link. Whether the five available time slots per frame, on a reverse frequency return link carrier, are assigned to one radiotelephone or to five different radiotelephones, they can be assigned contiguously in these embodiments. As was described in connection with FIG. 12, these five contiguous slots can be assigned to high-power users while the remaining three slots may be used to serve low-power users.

Other embodiments may be based on operating the ATC entirely in reverse frequency mode compared to the SBC. In these embodiments, an ATC transmits over the satellite return link frequencies while radiotelephones respond over the satellite forward link frequencies. If sufficient contiguous spectrum exists to support CDMA technologies, and in particular the emerging Wideband-CDMA 3G standard, the ATC forward link can be based on Wideband-CDMA to increase or maximize data throughput capabilities. Interference with GPS may not be an issue since the ATCs transmit over the satellite return link in these embodiments. Instead, interference may become a concern for the radiotelephones. Based, however, on embodiments of FIGS. 11–12, the radiotelephones can be configured to transmit GSM since ATC return link rates are expected, in any event, to be lower than those of the forward link. Accordingly, the ATC return link may employ GPRS-based data modes, possibly even EDGE. Thus, return link carriers that fall within a predetermined frequency interval from the GPS band-edge of 1559 MHz, can be under loaded, per embodiments of FIG. 11 or 12, to satisfy GPS interference concerns.

Finally, other embodiments may use a partial or total reverse frequency mode and may use CDMA on both forward and return links. In these embodiments, the ATC forward link to the radiotelephones utilizes the frequencies of the satellite return link (1626.5 MHz to 1660.5 MHz) whereas the ATC return link from the radiotelephones uses the frequencies of the satellite forward link (1525 MHz to 1559 MHz). The ATC forward link can be based on an existing or developing CDMA technology (e.g., IS-95, Wideband-CDMA, etc.). The ATC network return link can also be based on an existing or developing CDMA technology provided that the radiotelephone's output is gated to cease transmissions for approximately 3 msec once every T msec. In some embodiments, T will be greater than or equal to 6 msec.

This gating may not be needed for ATC return link carriers at approximately 1550 MHz or below. This gating can reduce or minimize out-of-band interference (desensitization) effects for GPS receivers in the vicinity of an ATC. To increase the benefit to GPS, the gating between all radiotelephones over an entire ATC service area can be substantially synchronized. Additional benefit to GPS may be derived from system-wide synchronization of gating. The ATCs can instruct all active radiotelephones regarding the gating epoch. All ATCs can be mutually synchronized via GPS.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A satellite radiotelephone system comprising:
    a space-based component that is configured to receive wireless communications from a first radiotelephone in a satellite footprint over a satellite radiotelephone frequency band;
    an ancillary terrestrial network that is configured to receive wireless communications from a second radiotelephone in the satellite footprint over the satellite radiotelephone frequency band, the space-based component also receiving the wireless communications from the second radiotelephone in the satellite footprint over the satellite radiotelephone frequency band as interference along with the wireless communications that are received from the first radiotelephone in the satellite footprint over the satellite radiotelephone frequency band; and
    an interference reducer that is responsive to the space-based component and to the ancillary terrestrial network, and that is configured to reduce the interference from the wireless communications that are received by the space-based component from the first radiotelephone in the satellite footprint over the satellite radiotelephone frequency band, using the wireless communications that are received by the ancillary terrestrial network from the second radiotelephone in the satellite footprint over the satellite radiotelephone frequency band.

2. A satellite radiotelephone system according to claim 1 wherein the ancillary terrestrial network is closer to the second radiotelephone than to the space-based component such that the wireless communications from the second radiotelephone are received by the ancillary terrestrial network prior to reception by the space based component and wherein the interference reducer is configured to generate at least one delayed replica of the wireless communications from the second radiotelephone that are received by the ancillary terrestrial network and to subtract the delayed replica of the wireless communications from the second radiotelephone that are received by the ancillary terrestrial network from the wireless communications that are received from the space-based component.

3. A satellite radiotelephone system according to claim 1 wherein the interference reducer comprises an adaptive interference canceller.

4. A satellite radiotelephone system according to claim 1 further comprising a gateway that communicates with the space-based component and with the ancillary terrestrial network and wherein the interference reducer is at least partially included in the gateway.

5. A satellite radiotelephone system according to claim 1:
    wherein the space-based component is further configured to receive wireless communications from radiotelephones over a first range of satellite band return link frequencies and to transmit wireless communications to the radiotelephones over a second range of satellite band forward link frequencies that is spaced apart from the first range; and
    wherein the ancillary terrestrial network is further selectively configured to receive wireless communications from the radiotelephones over the first range of satellite band return link frequencies and to transmit wireless communications to the radiotelephones over the second range of satellite band forward link frequencies that is spaced apart from the first range in a first mode of operation and to transmit wireless communications to the radiotelephones over a modified second range of satellite band forward link frequencies in a second mode of operation.

6. A satellite radiotelephone system according to claim 5 wherein the modified second range of satellite band forward link frequencies is selected to reduce, compared to the second range of satellite band forward link frequencies, interference with wireless receivers that operate outside the second range of satellite band forward link frequencies.

7. A satellite radiotelephone system according to claim 5 wherein the modified second range of satellite band forward link frequencies includes only a subset of the second range of satellite band forward link frequencies so as to provide a guard band within the second range of satellite band forward link frequencies that is not used to transmit wireless communications from the ancillary terrestrial network to the radiotelephones.

8. A satellite radiotelephone system according to claim 5 wherein the modified second range of satellite band forward link frequencies includes a plurality of frequencies in the second range of satellite band forward link frequencies that are transmitted by the ancillary terrestrial network to the radiotelephones at a power level that monotonically decreases as a function of frequency.

9. A satellite radiotelephone system according to claim 8 wherein the plurality of frequencies in the second range of satellite band forward link frequencies are transmitted by the ancillary terrestrial network to the radiotelephones at a maximum power level that monotonically decreases as a function of frequency.

10. A satellite radiotelephone system according to claim 5 wherein at least one frequency in the modified second range of satellite band forward link frequencies that is transmitted by the ancillary terrestrial network to the radiotelephones comprises a frame including a plurality of slots and wherein at least two contiguous slots in the frame that is transmitted by the ancillary terrestrial network to the radiotelephones are left unoccupied.

11. A satellite radiotelephone system according to claim 5 wherein at least one frequency in the modified second range of satellite band forward link frequencies that is transmitted by the ancillary terrestrial network to the radiotelephones comprises a frame including a plurality of slots and wherein at least two contiguous slots in the frame that is transmitted by the ancillary terrestrial network to the radiotelephones are transmitted at lower power than remaining slots in the frame that is transmitted by the ancillary terrestrial network to the radiotelephones.

12. A satellite radiotelephone system according to claim 5:
wherein the space-based component is configured to receive wireless communications from radiotelephones over a first range of satellite band return link frequencies and to transmit wireless communications to the radiotelephones over a second range of satellite band forward link frequencies that is spaced apart from the first range; and
wherein the ancillary terrestrial network is selectively configured to receive wireless communications from the radiotelephones over a first range of satellite band return link frequencies and to transmit wireless communications to the radiotelephones over a second range of satellite band forward link frequencies that is spaced apart from the first range in a first mode of operation and to receive wireless communications from the radiotelephones over at least a subset of the second range of satellite band forward link frequencies and to transmit wireless communications to the radiotelephones over at least a subset of the first range of satellite band return link frequencies that is spaced apart from the second range in a second mode of operation.

13. A satellite radiotelephone system comprising:
a space-based component that is configured to receive wireless communications from radiotelephones over a first range of satellite band return link frequencies and to transmit wireless communications to the radiotelephones over a second range of satellite band forward link frequencies that is spaced apart from the first range; and
a multiple mode ancillary terrestrial component that is selectively configured to receive wireless communications from the radiotelephones over the first range of satellite band return link frequencies and to transmit wireless communications to the radiotelephones over the second range of satellite band forward link frequencies that is spaced apart from the first range in a first mode of operation and to transmit wireless communications to the radiotelephones over a modified second range of satellite band forward link frequencies in a second mode of operation.

14. A satellite radiotelephone system according to claim 13 wherein the modified second range of satellite band forward link frequencies is selected to reduce, compared to the second range of satellite band forward link frequencies, interference with wireless receivers that operate outside the second range of satellite band forward link frequencies.

15. A satellite radiotelephone system according to claim 13 wherein the multiple mode ancillary terrestrial component also is selectively configured to receive wireless communications from the radiotelephones over a modified first range of satellite band return link frequencies that is spaced apart from the second range in the second mode of operation.

16. A satellite radiotelephone system according to claim 13 wherein the first range of satellite band return link frequencies and the second range of satellite band forward link frequencies both are contained in an L-band of satellite frequencies.

17. A satellite radiotelephone system according to claim 13 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the modified second range of satellite band forward link frequencies is selected to reduce, compared to the second range of satellite band forward link frequencies, interference with GPS/GLONASS wireless receivers.

18. A satellite radiotelephone system according to claim 13 wherein the modified second range of satellite band forward link frequencies includes only a subset of the second range of satellite band forward link frequencies so as to provide a guard band within the second range of satellite band forward link frequencies that is not used to transmit wireless communications from the multiple mode ancillary terrestrial component to the radiotelephones.

19. A satellite radiotelephone system according to claim 18 wherein the modified second range of satellite band forward link frequencies includes only a subset at a low frequency portion of the second range of satellite band forward link frequencies so as to provide a guard band at a high frequency portion of the second range of satellite band forward link frequencies that is not used to transmit wireless communications from the multiple mode ancillary terrestrial component to the radiotelephones.

20. A satellite radiotelephone system according to claim 19 wherein the first range of satellite band return link frequencies is contained in an L-band of satellite frequencies above GPS/GLONASS frequencies, wherein the second range of satellite band forward link frequencies is contained in the L-band of satellite frequencies below the GPS/ GLONASS frequencies and wherein the modified second range of satellite band forward link frequencies includes only a portion of the second range of satellite band forward link frequencies that is remote from the GPS/GLONASS frequencies so as to provide a guard band in a portion of the second range of satellite band forward link frequencies that is adjacent the GPS/GLONASS frequencies.

21. A satellite radiotelephone system according to claim 18 wherein the multiple mode ancillary terrestrial component also is selectively configured to receive wireless communications from the radiotelephones over a modified first range of satellite band return link frequencies that is spaced apart from the second range in the second mode of operation, the modified first range of satellite band return link frequencies including at least one time-division duplex frequency that is used to transmit wireless communications to the radiotelephones and to receive wireless communications from the radiotelephones at different times.

22. A satellite radiotelephone system according to claim 21 wherein the at least one time-division duplex frequency that is used to transmit wireless communications to the radiotelephones and to receive wireless communications from the radiotelephones at different times comprises a frame including a plurality of slots, wherein at least a first one of the slots is used to transmit wireless communications to the radiotelephones and wherein at least a second one of the slots is used to receive wireless communications from the radiotelephones.

23. A satellite radiotelephone system according to claim 21 wherein the modified first range of satellite band return link frequencies comprises the entire first range of satellite band return link frequencies that is time division multiplexed to transmit wireless communications to the radiotelephones and to receive wireless communications from the radiotelephones at different times.

24. A satellite radiotelephone system according to claim 21 wherein the at least one time-division duplex frequency that is used to transmit wireless communications to the radiotelephones and to receive wireless communications from the radiotelephones at different times comprises a frame including a plurality of slots, wherein a first number of the slots is used to transmit wireless communications to the radiotelephones and wherein a second number of the slots is used to receive wireless communications from the radiotelephones, wherein the first number is greater than the second number.

25. A satellite radiotelephone system according to claim 21 wherein the at least one time-division duplex frequency that is used to transmit wireless communications to the radiotelephones and to receive wireless communications from the radiotelephones at different times comprises a frame including a plurality of slots, wherein at least a first one of the slots is used to transmit wireless communications to the radiotelephones using EDGE modulation and/or protocol, and wherein at least a second one of the slots is used to receive wireless communications from the radiotelephones using GPRS modulation and/or protocol.

26. A satellite radiotelephone system according to claim 21 wherein the at least one time-division duplex frequency that is used to transmit wireless communications to the radiotelephones and to receive wireless communications from the radiotelephones at different times comprises a frame including a plurality of slots, wherein at least a first one of the slots is used to transmit wireless communications to the radiotelephones using a first modulation and/or protocol, and wherein at least a second one of the slots is used to receive wireless communications from the radiotelephones using a second modulation and/or protocol, wherein the first modulation and/or protocol is more spectrally efficient than the second modulation and/or protocol.

27. A satellite radiotelephone system according to claim 13 wherein the modified second range of satellite band forward link frequencies includes a plurality of frequencies in the second range of satellite band forward link frequencies that are transmitted by the ancillary terrestrial component to the radiotelephones at a power level that monotonically decreases as a function of frequency.

28. A satellite radiotelephone system according to claim 13 wherein the plurality of frequencies in the second range of satellite band forward link frequencies are transmitted by the ancillary terrestrial component to the radiotelephones at a maximum power level that monotonically decreases as a function of frequency.

29. A satellite radiotelephone system according to claim 27 wherein the modified second range of satellite band forward link frequencies includes a subset of frequencies at a first or second end of the second range of satellite band forward link frequencies that are transmitted by the ancillary terrestrial component to the radiotelephones at a power level that monotonically decreases toward the first or second end of the second range of satellite band forward link frequencies.

30. A satellite radiotelephone system according to claim 27 wherein the power level is a maximum power level.

31. A satellite radiotelephone system according to claim 27 wherein the first range of satellite band return link frequencies is contained in an L-band of satellite frequencies above GPS/GLONASS frequencies, wherein the second range of satellite band forward link frequencies is contained in the L-band of satellite frequencies below the GPS/ GLONASS frequencies and wherein the modified second range of satellite band forward link frequencies includes a subset of frequencies proximate to an end of the second range of satellite band forward link frequencies adjacent the GPS/GLONASS frequencies that are transmitted by the ancillary terrestrial component to the radiotelephones at a power level that monotonically decreases toward the end of the second range of satellite band forward link frequencies adjacent the GPS/GLONASS frequencies.

32. A satellite radiotelephone system according to claim 31 wherein the power level is a maximum power level.

33. A satellite radiotelephone system according to claim 26 wherein the modified second range of satellite band forward link frequencies includes a plurality of frequencies in the second range of satellite band forward link frequencies that are transmitted by the ancillary terrestrial component to the radiotelephones as a function of a distance of a respective radiotelephone from the ancillary terrestrial component and at a power level that monotonically decreases as a function of frequency.

34. A satellite radiotelephone system according to claim 33 wherein the power level is a maximum power level.

35. A cellular satellite radiotelephone system according to claim 13 wherein at least one frequency in the modified second range of satellite band forward link frequencies that is transmitted by the ancillary terrestrial component to the radiotelephones comprises a frame including a plurality of slots and wherein at least two contiguous slots in the frame that is transmitted by the ancillary terrestrial component to the radiotelephones are left unoccupied.

36. A satellite radiotelephone system according to claim 13 wherein at least one frequency in the modified second range of satellite band forward link frequencies that is transmitted by the ancillary terrestrial component to the radiotelephones comprises a frame including a plurality of slots and wherein at least two contiguous slots in the frame that is transmitted by the ancillary terrestrial component to the radiotelephones are transmitted at lower power than remaining slots in the frame that is transmitted by the ancillary terrestrial component to the radiotelephones.

37. A satellite radiotelephone system according to claim 36 wherein the at least two contiguous slots are transmitted at lower power by the ancillary terrestrial component to first selected ones of the radiotelephones that are relatively close to the ancillary terrestrial component and wherein the remaining slots are transmitted at higher power by the ancillary terrestrial component to second selected ones of the radiotelephones that are relatively far from the ancillary terrestrial component.

38. A satellite radiotelephone system according to claim 36 wherein the at least one frequency is proximate to a first or second end of the second range of satellite band forward link frequencies that are transmitted by the ancillary terrestrial component to the radiotelephones.

39. A satellite radiotelephone system according to claim 36 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the at least one frequency is proximate to an end of the second range of satellite band forward link frequencies adjacent the GPS/GLONASS frequencies that are transmitted by the ancillary terrestrial component to the radiotelephones.

40. A satellite radiotelephone system comprising:
a space-based component that is configured to receive wireless communications from radiotelephones over a first range of satellite band return link frequencies and to transmit wireless communications to the radiotelephones over a second range of satellite band forward link frequencies that is spaced apart from the first range; and
a multiple mode ancillary terrestrial component that is selectively configured to receive wireless communications from the radiotelephones over a first range of satellite band return link frequencies and to transmit wireless communications to the radiotelephones over a second range of satellite band forward link frequencies that is spaced apart from the first range in a first mode of operation and to receive wireless communications from the radiotelephones over at least a subset of the second range of satellite band forward link frequencies and to transmit wireless communications to the radiotelephones over at least a subset of the first range of satellite band return link frequencies that is spaced apart from the second range in a second mode of operation.

41. A satellite radiotelephone system according to claim 40 wherein the multiple mode ancillary terrestrial component is selectively configured to receive wireless communications from the radiotelephones over all of the second range of satellite band forward link frequencies and to transmit wireless communications to the radiotelephones over all of the first range of satellite band return link frequencies that is spaced apart from the second range in the second mode of operation.

42. A satellite radiotelephone system comprising:
a space-based component that is configured to receive wireless communications from radiotelephones over a first range of satellite band return link frequencies and to transmit wireless communications to the radiotelephones over a second range of satellite band forward link frequencies that is spaced apart from the first range; and
an ancillary terrestrial component that is configured to transmit wireless communications to the radiotelephones over a modified second range of satellite band forward link frequencies.

43. A satellite radiotelephone system according to claim 42 wherein the modified second range of satellite band forward link frequencies is selected to reduce, compared to the second range of satellite band forward link frequencies, interference with wireless receivers that operate outside the second range of satellite band forward link frequencies.

44. A satellite radiotelephone system according to claim 42 wherein the ancillary terrestrial component also is selectively configured to receive wireless communications from the radiotelephones over a modified first range of satellite band return link frequencies that is spaced apart from the second range.

45. A satellite radiotelephone system according to claim 42 wherein the first range of satellite band return link frequencies and the second range of satellite band forward link frequencies both are contained in an L-band of satellite frequencies.

46. A satellite radiotelephone system according to claim 42 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the modified second range of satellite band forward link frequencies is selected to reduce, compared to the second range of satellite band forward link frequencies, interference with GPS/GLONASS wireless receivers.

47. A satellite radiotelephone system according to claim 42 wherein the modified second range of satellite band forward link frequencies includes only a subset of the second range of satellite band forward link frequencies so as to provide a guard band within the second range of satellite band forward link frequencies that is not used to transmit wireless communications from the ancillary terrestrial component to the radiotelephones.

48. A satellite radiotelephone system according to claim 47 wherein the modified second range of satellite band forward link frequencies includes only a subset at a low frequency portion of the second range of satellite band forward link frequencies so as to provide a guard band at a high frequency portion of the second range of satellite band forward link frequencies that is not used to transmit wireless communications from the ancillary terrestrial component to the radiotelephones.

49. A satellite radiotelephone system according to claim 48 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the modified second range of satellite band forward link frequencies includes only a portion of the second range of satellite band forward link frequencies that is remote from the GPS/GLONASS frequencies so as to provide a guard band in a portion of the second range of satellite band forward link frequencies that is adjacent the GPS/GLONASS frequencies.

50. A satellite radiotelephone system according to claim 47 wherein the ancillary terrestrial component also is selectively configured to receive wireless communications from the radiotelephones over a modified first range of satellite band return link frequencies that is spaced apart from the second range, the modified first range of satellite band return link frequencies including at least one time-division duplex frequency that is used to transmit wireless communications to the radiotelephones and to receive wireless communications from the radiotelephones at different times.

51. A satellite radiotelephone system according to claim 50 wherein the at least one time-division duplex frequency that is used to transmit wireless communications to the radiotelephones and to receive wireless communications from the radiotelephones at different times comprises a frame including a plurality of slots, wherein at least a first one of the slots is used to transmit wireless communications to the radiotelephones and wherein at least a second one of the slots is used to receive wireless communications from the radiotelephones.

52. A satellite radiotelephone system according to claim 50 wherein the modified first range of satellite band return link frequencies comprises the entire first range of satellite band return link frequencies that is time division multiplexed to transmit wireless communications to the radiotelephones and to receive wireless communications from the radiotelephones at different times.

53. A satellite radiotelephone system according to claim 50 wherein the at least one time-division duplex frequency that is used to transmit wireless communications to the radiotelephones and to receive wireless communications from the radiotelephones at different times comprises a frame including a plurality of slots, wherein a first number of the slots is used to transmit wireless communications to the radiotelephones and wherein a second number of the slots is used to receive wireless communications from the radiotelephones, wherein the first number is greater than the second number.

54. A satellite radiotelephone system according to claim 50 wherein the at least one time-division duplex frequency that is used to transmit wireless communications to the radiotelephones and to receive wireless communications from the radiotelephones at different times comprises a frame including a plurality of slots, wherein at least a first one of the slots is used to transmit wireless communications to the radiotelephones using EDGE modulation and/or protocol and wherein at least a second one of the slots is used to receive wireless communications from the radiotelephones using GPRS modulation and/or protocol.

55. A satellite radiotelephone system according to claim 50 wherein the at least one time-division duplex frequency that is used to transmit wireless communications to the radiotelephones and to receive wireless communications from the radiotelephones at different times comprises a frame including a plurality of slots, wherein at least a first one of the slots is used to transmit wireless communications to the radiotelephones using a first modulation and/or protocol and wherein at least a second one of the slots is used to receive wireless communications from the radiotelephones using a second modulation and/or protocol, wherein the first modulation and/or protocol is more spectrally efficient than the second modulation and/or protocol.

56. A satellite radiotelephone system according to claim 42 wherein the modified second range of satellite band forward link frequencies includes a plurality of frequencies in the second range of satellite band forward link frequencies that are transmitted by the ancillary terrestrial component to the radiotelephones at a power level that monotonically decreases as a function of frequency.

57. A satellite radiotelephone system according to claim 56 wherein the power level is a maximum power level.

58. A satellite radiotelephone system according to claim 56 wherein the modified second range of satellite band forward link frequencies includes a subset of frequencies proximate to a first or second end of the second range of satellite band forward link frequencies that are transmitted by the ancillary terrestrial component to the radiotelephones at a power level that monotonically decreases toward the first or second end of the second range of satellite band forward link frequencies.

59. A satellite radiotelephone system according to claim 58 wherein the power level is a maximum power level.

60. A satellite radiotelephone system according to claim 58 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the modified second range of satellite band forward link frequencies includes a subset of frequencies at an end of the second range of satellite band forward link frequencies adjacent the GPS/GLONASS frequencies that are transmitted by the ancillary terrestrial component to the radiotelephones at a power level that monotonically decreases toward the end of the second range of satellite band forward link frequencies adjacent the GPS/GLONASS frequencies.

61. A satellite radiotelephone system according to claim 60 wherein the power level is a maximum power level.

62. A satellite radiotelephone system according to claim 56 wherein the modified second range of satellite band forward link frequencies includes a plurality of frequencies in the second range of satellite band forward link frequencies that are transmitted by the ancillary terrestrial component to the radiotelephones as a function of a distance of a respective radiotelephone from the ancillary terrestrial component and at a power level that monotonically decreases as a function of frequency.

63. A satellite radiotelephone system according to claim 62 wherein the power level is a maximum power level.

64. A satellite radiotelephone system according to claim 42 wherein at least one frequency in the modified second range of satellite band forward link frequencies that is transmitted by the ancillary terrestrial component to the radiotelephones comprises a frame including a plurality of slots and wherein at least two contiguous slots in the frame that is transmitted by the ancillary terrestrial component to the radiotelephones are left unoccupied.

65. A satellite radiotelephone system according to claim 42 wherein at least one frequency in the modified second range of satellite band forward link frequencies that is transmitted by the ancillary terrestrial component to the radiotelephones comprises a frame including a plurality of slots and wherein at least two contiguous slots in the frame that is transmitted by the ancillary terrestrial component to the radiotelephones are transmitted at lower power than remaining slots in the frame that is transmitted by the ancillary terrestrial component to the satellite radiotelephones.

66. A satellite radiotelephone system according to claim 65 wherein the at least two contiguous slots are transmitted at lower power by the ancillary terrestrial component to first selected ones of the radiotelephones that are relatively close to the ancillary terrestrial component and wherein the remaining slots are transmitted at higher power by the ancillary terrestrial component to second selected ones of the radiotelephones that are relatively far from the ancillary terrestrial component.

67. A satellite radiotelephone system according to claim 60 wherein the at least one frequency is proximate to a first or second end of the second range of satellite band forward link frequencies that are transmitted by the ancillary terrestrial component to the radiotelephones.

68. A satellite radiotelephone system according to claim 67 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the at least one frequency is proximate to an end of the second range of satellite band forward link frequencies adjacent the GPS/GLONASS frequencies that are transmitted by the ancillary terrestrial component to the radiotelephones.

69. A gateway for a satellite radiotelephone system that includes a space-based component that is configured to receive wireless communications from a first radiotelephone in a satellite footprint over a satellite radiotelephone frequency band and an ancillary terrestrial network that is configured to receive wireless communications from a second radiotelephone in the satellite footprint over the satellite radiotelephone frequency band, the space-based component also receiving the wireless communications from the second radiotelephone in the satellite footprint over the satellite radiotelephone frequency band as interference along with the wireless communications that are received from the first radiotelephone in the satellite footprint over the satellite radiotelephone frequency band, the gateway comprising:

an interference reducer that is responsive to the space-based component and to the ancillary terrestrial network, and that is configured to reduce the interference from the wireless communications that are received by the space-based component from the second radiotelephone in the satellite footprint over the satellite radiotelephone frequency band, using the wireless communications that are received by the ancillary terrestrial network from the second radiotelephone in the satellite footprint over the satellite radiotelephone frequency band.

70. A gateway according to claim 69 wherein the ancillary terrestrial network is closer to the second radiotelephone than to the space-based component such that the wireless communications from the second radiotelephone are received by the ancillary terrestrial network prior to reception by the space based component and wherein the interference reducer is configured to generate at least one delayed replica of the wireless communications from the second radiotelephone that are received by the ancillary terrestrial network and to subtract the delayed replica of the wireless communications from the second radiotelephone that are received by the ancillary terrestrial network from the wireless communications that are received from the space-based component.

71. A gateway according to claim 69 wherein the interference reducer comprises an adaptive interference canceller.

72. A multiple mode ancillary terrestrial component for a satellite radiotelephone system that includes a space-based component that is configured to receive wireless communications from radiotelephones over a first range of satellite band return link frequencies and to transmit wireless communications to the radiotelephones over a second range of satellite band forward link frequencies that is spaced apart from the first range, the multiple mode terrestrial component comprising:

an electronics system that is selectively configured to receive wireless communications from the radiotelephones over the first range of satellite band return link frequencies and to transmit wireless communications to the radiotelephones over the second range of satellite band forward link frequencies that is spaced apart from the first range in a first mode of operation and to transmit wireless communications to the radiotelephones over a modified second range of satellite band forward link frequencies in a second mode of operation.

73. A multiple mode ancillary terrestrial component according to claim 72 wherein the modified second range of satellite band forward link frequencies is selected to reduce, compared to the second range of satellite band forward link frequencies, interference with wireless receivers that operate outside the second range of satellite band forward link frequencies.

74. A multiple mode ancillary terrestrial component according to claim 72 wherein the electronics system also is selectively configured to receive wireless communications from the radiotelephones over a modified first range of satellite band return link frequencies that is spaced apart from the second range in the second mode of operation.

75. A multiple mode ancillary terrestrial component according to claim 72 wherein the first range of satellite band return link frequencies and the second range of satellite band forward link frequencies both are contained in an L-band of satellite frequencies.

76. A multiple mode ancillary terrestrial component according to claim 72 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the modified second range of satellite band forward link frequencies is selected to reduce, compared to the second range of satellite band forward link frequencies, interference with GPS/GLONASS wireless receivers.

77. A multiple mode ancillary terrestrial component according to claim 72 wherein the modified second range of satellite band forward link frequencies includes only a subset of the second range of satellite band forward link frequencies so as to provide a guard band within the second range of satellite band forward link frequencies that is not used to transmit wireless communications from the electronics system to the radiotelephones.

78. A multiple mode ancillary terrestrial component according to claim 77 wherein the modified second range of satellite band forward link frequencies includes only a subset proximate to a low frequency portion of the second range of satellite band forward link frequencies so as to provide a guard band at a high frequency portion of the second range of satellite band forward link frequencies that is not used to transmit wireless communications from the electronics system to the radiotelephones.

79. A multiple mode ancillary terrestrial component according to claim 78 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the modified second range of satellite band forward link frequencies includes only a portion of the second range of satellite band forward link frequencies that is remote from the GPS/GLONASS frequencies so as to provide a guard band in a portion of the second range of satellite band forward link frequencies that is adjacent the GPS/GLONASS frequencies.

80. A multiple mode ancillary terrestrial component according to claim 77 wherein the electronics system also is selectively configured to receive wireless communications from the radiotelephones over a modified first range of satellite band return link frequencies that is spaced apart from the second range in the second mode of operation, the modified first range of satellite band return link frequencies including at least one time-division duplex frequency that is used to transmit wireless communications to the radiotelephones and to receive wireless communications from the radiotelephones at different times.

81. A multiple mode ancillary terrestrial component according to claim 80 wherein the at least one time-division duplex frequency that is used to transmit wireless communications to the radiotelephones and to receive wireless communications from the radiotelephones at different times comprises a frame including a plurality of slots, wherein at least a first one of the slots is used to transmit wireless communications to the radiotelephones and wherein at least a second one of the slots is used to receive wireless communications from the radiotelephones.

82. A multiple mode ancillary terrestrial component according to claim 80 wherein the modified first range of satellite band return link frequencies comprises the entire first range of satellite band return link frequencies that is time division multiplexed to transmit wireless communications to the radiotelephones and to receive wireless communications from the radiotelephones at different times.

83. A multiple mode ancillary terrestrial component according to claim 80 wherein the at least one time-division duplex frequency that is used to transmit wireless communications to the radiotelephones and to receive wireless communications from the radiotelephones at different times comprises a frame including a plurality of slots, wherein a first number of the slots is used to transmit wireless communications to the radiotelephones and wherein a second number of the slots is used to receive wireless communications from the radiotelephones, wherein the first number is greater than the second number.

84. A multiple mode ancillary terrestrial component according to claim 80 wherein the at least one time-division duplex frequency that is used to transmit wireless communications to the radiotelephones and to receive wireless communications from the radiotelephones at different times comprises a frame including a plurality of slots, wherein at least a first one of the slots is used to transmit wireless communications to the radiotelephones using EDGE modulation and/or protocol and wherein at least a second one of the slots is used to receive wireless communications from the radiotelephones using GPRS modulation and/or protocol.

85. A multiple mode ancillary terrestrial component according to claim 80 wherein the at least one time-division duplex frequency that is used to transmit wireless communications to the radiotelephones and to receive wireless communications from the radiotelephones at different times comprises a frame including a plurality of slots, wherein at least a first one of the slots is used to transmit wireless communications to the radiotelephones using a first modulation and/or protocol and wherein at least a second one of the slots is used to receive wireless communications from the radiotelephones using a second modulation and/or protocol, wherein the first modulation and/or protocol is more spectrally efficient than the second modulation and/or protocol.

86. A multiple mode ancillary terrestrial component according to claim 72 wherein the modified second range of satellite band forward link frequencies includes a plurality of frequencies in the second range of satellite band forward link frequencies that are transmitted by the electronics system to the radiotelephones at a power level that monotonically decreases as a function of frequency.

87. A multiple mode ancillary terrestrial component according to claim 86 wherein the power level is a maximum power level.

88. A multiple mode ancillary terrestrial component according to claim 83 wherein the modified second range of satellite band forward link frequencies includes a subset of frequencies proximate to a first or second end of the second range of satellite band forward link frequencies that are transmitted by the electronics system to the radiotelephones at a power level that monotonically decreases toward the first or second end of the second range of satellite band forward link frequencies.

89. A multiple mode ancillary terrestrial component according to claim 88 wherein the power level is a maximum power level.

90. A multiple mode ancillary terrestrial component according to claim 88 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the modified second range of satellite band forward link frequencies includes a subset of frequencies proximate to an end of the second range of satellite band forward link frequencies adjacent the GPS/GLONASS frequencies that are transmitted by the electronics system to the radiotelephones at a power level that monotonically decreases toward the end of the second range of satellite band forward link frequencies adjacent the GPS/GLONASS frequencies.

91. A multiple mode ancillary terrestrial component according to claim 90 wherein the power level is a maximum power level.

92. A multiple mode ancillary terrestrial component according to claim 86 wherein the modified second range of satellite band forward link frequencies includes a plurality of frequencies in the second range of satellite band forward link frequencies that are transmitted by the electronics system to the radiotelephones as a function of a distance of a respective radiotelephone from the electronics system and at a power level that monotonically decreases as a function of frequency.

93. A multiple mode ancillary terrestrial component according to claim 92 wherein the power level is a maximum power level.

94. A multiple mode ancillary terrestrial component according to claim 72 wherein at least one frequency in the modified second range of satellite band forward link frequencies that is transmitted by the electronics system to the radiotelephones comprises a frame including a plurality of slots and wherein at least two contiguous slots in the frame that is transmitted by the electronics system to the radiotelephones are left unoccupied.

95. A multiple mode ancillary terrestrial component according to claim 72 wherein at least one frequency in the modified second range of satellite band forward link frequencies that is transmitted by the electronics system to the radiotelephones comprises a frame including a plurality of slots and wherein at least two contiguous slots in the frame that is transmitted by the electronics system to the radiotelephones are transmitted at lower power than remaining slots in the frame that is transmitted by the electronics system to the radiotelephones.

96. A multiple mode ancillary terrestrial component according to claim 95 wherein the at least two contiguous slots are transmitted at lower power by the electronics system to first selected ones of the radiotelephones that are relatively close to the electronics system and wherein the remaining slots are transmitted at higher power by the electronics system to second selected ones of the radiotelephones that are relatively far from the electronics system.

97. A multiple mode ancillary terrestrial component according to claim 95 wherein the at least one frequency is proximate to a first or second end of the second range of satellite band forward link frequencies that are transmitted by the electronics system to the radiotelephones.

98. A multiple mode ancillary terrestrial component according to claim 95 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the at least one frequency is proximate to an end of the second range of satellite band forward link frequencies adjacent the GPS/GLONASS frequencies that are transmitted by the electronics system to the radiotelephones.

99. A multiple mode ancillary terrestrial component for a satellite radiotelephone system that includes a space-based component that is configured to receive wireless communications from radiotelephones over a first range of satellite band return link frequencies and to transmit wireless communications to the radiotelephones over a second range of satellite band forward link frequencies that is spaced apart from the first range, the multiple mode ancillary terrestrial component comprising:

an electronics system that is selectively configured to receive wireless communications from the radiotelephones over a first range of satellite band return link frequencies and to transmit wireless communications to the radiotelephones over a second range of satellite band forward link frequencies that is spaced apart from the first range in a first mode of operation and to receive wireless communications from the radiotelephones over at least a subset of the second range of satellite band forward link frequencies and to transmit wireless communications to the radiotelephones over at least a subset of the first range of satellite band return link frequencies that is spaced apart from the second range in a second mode of operation.

100. A multiple mode ancillary terrestrial component according to claim 99 wherein the electronics system is selectively configured to receive wireless communications from the radiotelephones over all of the second range of satellite band forward link frequencies and to transmit wireless communications to the radiotelephones over all of the first range of satellite band return link frequencies that is spaced apart from the second range in the second mode of operation.

101. An ancillary terrestrial component for a satellite radiotelephone system that includes a space-based component that is configured to receive wireless communications from radiotelephones over a first range of satellite band return link frequencies and to transmit wireless communications to the radiotelephones over a second range of satellite band forward link frequencies that is spaced apart from the first range, the ancillary terrestrial component comprising:

an electronics system that is configured to transmit wireless communications to the radiotelephones over a modified second range of satellite band forward link frequencies.

102. An ancillary terrestrial component according to claim 101 wherein the modified second range of satellite band forward link frequencies is selected to reduce, compared to the second range of satellite band forward link frequencies, interference with wireless receivers that operate outside the second range of satellite band forward link frequencies.

103. An ancillary terrestrial component according to claim 101 wherein the electronics system also is configured to receive wireless communications from the radiotelephones over a modified first range of satellite band return link frequencies that is spaced apart from the second range.

104. An ancillary terrestrial component according to claim 101 wherein the first range of satellite band return link frequencies and the second range of satellite band forward link frequencies both are contained in an L-band of satellite frequencies.

105. An ancillary terrestrial component according to claim 101 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the modified second range of satellite band forward link frequencies is selected to reduce, compared to the second range of satellite band forward link frequencies, interference with GPS/GLONASS wireless receivers.

106. An ancillary terrestrial component according to claim 101 wherein the modified second range of satellite band forward link frequencies includes only a subset of the second range of satellite band forward link frequencies so as to provide a guard band within the second range of satellite band forward link frequencies that is not used to transmit wireless communications from the electronics system to the radiotelephones.

107. An ancillary terrestrial component according to claim 106 wherein the modified second range of satellite band forward link frequencies includes only a subset at a low frequency portion of the second range of satellite band forward link frequencies so as to provide a guard band at a high frequency portion of the second range of satellite band forward link frequencies that is not used to transmit wireless communications from the electronics system to the radiotelephones.

108. An ancillary terrestrial component according to claim 107 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the modified second range of satellite band forward link frequencies includes only a portion of the second range of satellite band forward link frequencies that is remote from the GPS/GLONASS frequencies so as to provide a guard band in a portion of the second range of satellite band forward link frequencies that is adjacent the GPS/GLONASS frequencies.

109. An ancillary terrestrial component according to claim 106 wherein the electronics system also is configured to receive wireless communications from the radiotelephones over a modified first range of satellite band return link frequencies that is spaced apart from the second range, the modified first range of satellite band return link frequencies including at least one time-division duplex frequency that is used to transmit wireless communications to the radiotelephones and to receive wireless communications from the radiotelephones at different times.

110. An ancillary terrestrial component according to claim 109 wherein the at least one time-division duplex frequency that is used to transmit wireless communications to the radiotelephones and to receive wireless communications from the radiotelephones at different times comprises a frame including a plurality of slots, wherein at least a first one of the slots is used to transmit wireless communications to the radiotelephones and wherein at least a second one of the slots is used to receive wireless communications from the radiotelephones.

111. An ancillary terrestrial component according to claim 109 wherein the modified first range of satellite band return link frequencies comprises the entire first range of satellite band return link frequencies that is time division multiplexed to transmit wireless communications to the radiotelephones and to receive wireless communications from the radiotelephones at different times.

112. An ancillary terrestrial component according to claim 109 wherein the at least one time-division duplex frequency that is used to transmit wireless communications to the radiotelephones and to receive wireless communications from the radiotelephones at different times comprises a frame including a plurality of slots, wherein a first number of the slots is used to transmit wireless communications to the radiotelephones and wherein a second number of the slots is used to receive wireless communications from the radiotelephones, wherein the first number is greater than the second number.

113. An ancillary terrestrial component according to claim 109 wherein the at least one time-division duplex frequency that is used to transmit wireless communications to the radiotelephones and to receive wireless communications from the radiotelephones at different times comprises a frame including a plurality of slots, wherein at least a first one of the slots is used to transmit wireless communications to the radiotelephones using EDGE modulation and/or protocol and wherein at least a second one of the slots is used to receive wireless communications from the radiotelephones using GPRS modulation and/or protocol.

114. An ancillary terrestrial component according to claim 109 wherein the at least one time-division duplex frequency that is used to transmit wireless communications to the radiotelephones and to receive wireless communications from the radiotelephones at different times comprises a frame including a plurality of slots, wherein at least a first one of the slots is used to transmit wireless communications to the radiotelephones using a first modulation and/or protocol and wherein at least a second one of the slots is used to receive wireless communications from the radiotelephones using a second modulation and/or protocol, and wherein the first modulation and/or protocol is more spectrally efficient than the second modulation and/or protocol.

115. An ancillary terrestrial component according to claim 101 wherein the modified second range of satellite band forward link frequencies includes a plurality of frequencies in the second range of satellite band forward link frequencies that are transmitted by the ancillary terrestrial component to the radiotelephones at a power level that monotonically decreases as a function of frequency.

116. An ancillary terrestrial component according to claim 115 wherein the power level is a maximum power level.

117. An ancillary terrestrial component according to claim 115 wherein the modified second range of satellite band forward link frequencies includes a subset of frequencies at a first or second end of the second range of satellite band forward link frequencies that are transmitted by the electronics system to the radiotelephones at a power level that monotonically decreases toward the first or second end of the second range of satellite band forward link frequencies.

118. An ancillary terrestrial component according to claim 117 wherein the power level is a maximum power level.

119. An ancillary terrestrial component according to claim 117 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the modified second range of satellite band forward link frequencies includes a subset of frequencies proximate to an end of the second range of satellite band forward link frequencies adjacent the GPS/GLONASS frequencies that are transmitted by the electronics system to the radiotelephones at a power level that monotonically decreases toward the end of the second range of satellite band forward link frequencies adjacent the GPS/GLONASS frequencies.

120. An ancillary terrestrial component according to claim 119 wherein the power level is a maximum power level.

121. An ancillary terrestrial component according to claim 115 wherein the modified second range of satellite band forward link frequencies includes a plurality of frequencies in the second range of satellite band forward link frequencies that are transmitted by the electronics system to the radiotelephones as a function of a distance of a respective radiotelephone from the electronics system and at a power level that monotonically decreases as a function of frequency.

122. An ancillary terrestrial component according to claim 121 wherein the power level is a maximum power level.

123. An ancillary terrestrial component according to claim 101 wherein at least one frequency in the modified second range of satellite band forward link frequencies that is transmitted by the electronics system to the radiotelephones comprises a frame including a plurality of slots and wherein at least two contiguous slots in the frame that is transmitted by the electronics system to the radiotelephones are left unoccupied.

124. An ancillary terrestrial component according to claim 101 wherein at least one frequency in the modified second range of satellite band forward link frequencies that is transmitted by the electronics system to the radiotelephones comprises a frame including a plurality of slots and wherein at least two contiguous slots in the frame that is transmitted by the electronics system to the radiotelephones are transmitted at lower power than remaining slots in the frame that is transmitted by the electronics system to the radiotelephones.

125. An ancillary terrestrial component according to claim 124 wherein the at least two contiguous slots are transmitted at lower power by the electronics system to first selected ones of the radiotelephones that are relatively close to the electronics system and wherein the remaining slots are transmitted at higher power by the electronics system to second selected ones of the radiotelephones that are relatively far from the electronics system.

126. An ancillary terrestrial component according to claim 124 wherein the at least one frequency is proximate to a first or second end of the second range of satellite band forward link frequencies that are transmitted by the electronics system to the radiotelephones.

127. An ancillary terrestrial component according to claim 126 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the at least one frequency is proximate to an end of the second range of satellite band forward link frequencies adjacent the GPS/GLONASS frequencies that are transmitted by the electronics system to the radiotelephones.

128. A radiotelephone comprising:
an electronics system that is configured to communicate with a space-based component by transmitting wireless communications to the space-based component over a first range of satellite band return link frequencies and by receiving wireless communications from the space-based component over a second range of satellite band forward link frequencies that is spaced apart from the first range;
the electronics system also being configured to selectively communicate with a multiple mode ancillary terrestrial component by transmitting wireless communications to the ancillary terrestrial component over the first range of satellite band return link frequencies and by receiving wireless communications from the ancillary terrestrial component over the second range of satellite band forward link frequencies that is spaced apart from the first range in a first mode of operation and to receive wireless communications from the ancillary terrestrial component over a modified second range of satellite band forward link frequencies in a second mode of operation.

129. A radiotelephone according to claim 128 wherein the modified second range of satellite band forward link frequencies is selected to reduce, compared to the second range of satellite band forward link frequencies, interference with wireless receivers that operate outside the second range of satellite band forward link frequencies.

130. A radiotelephone according to claim 128 wherein the electronics system also is selectively configured to transmit wireless communications over a modified first range of satellite band return link frequencies that is spaced apart from the second range in the second mode of operation.

131. A radiotelephone according to claim 128 wherein the first range of satellite band return link frequencies and the second range of satellite band forward link frequencies both are contained in an L-band of satellite frequencies.

132. A radiotelephone according to claim 128 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the modified second range of satellite band forward link frequencies is selected to reduce, compared to the second range of satellite band forward link frequencies, interference with GPS/GLONASS wireless receivers.

133. A radiotelephone according to claim 128 wherein the modified second range of satellite band forward link frequencies includes only a subset of the second range of satellite band forward link frequencies so as to provide a guard band within the second range of satellite band forward link frequencies that is not used to transmit wireless communications from the multiple mode ancillary terrestrial component to the radiotelephone.

134. A radiotelephone according to claim 133 wherein the modified second range of satellite band forward link frequencies includes only a subset proximate to a low frequency portion of the second range of satellite band forward link frequencies so as to provide a guard band at a high frequency portion of the second range of satellite band forward link frequencies that is not used to transmit wireless communications from the multiple mode ancillary terrestrial component to the radiotelephone.

135. A radiotelephone according to claim 134 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the modified second range of satellite band forward link frequencies includes only a portion of the second range of satellite band forward link frequencies that is remote from the GPS/GLONASS frequencies so as to provide a guard band in a portion of the second range of satellite band forward link frequencies that is adjacent the GPS/GLONASS frequencies.

136. A radiotelephone according to claim 133 wherein the electronics system also is selectively configured to transmit wireless communications over a modified first range of satellite band return link frequencies that is spaced apart from the second range in the second mode of operation, the modified first range of satellite band return link frequencies including at least one time-division duplex frequency that is used to receive wireless communications and to transmit wireless communications at different times.

137. A radiotelephone according to claim 136 wherein the at least one time-division duplex frequency that is used to receive wireless communications and to transmit wireless communications at different times comprises a frame including a plurality of slots, wherein at least a first one of the slots is used to transmit wireless communications and wherein at least a second one of the slots is used to receive wireless communications.

138. A radiotelephone according to claim 136 wherein the modified first range of satellite band return link frequencies comprises the entire first range of satellite band return link frequencies that is time division multiplexed to transmit wireless communications and to receive wireless communications at different times.

139. A radiotelephone according to claim 136 wherein the at least one time-division duplex frequency that is used to transmit wireless communications and to receive wireless communications at different times comprises a frame including a plurality of slots, wherein a first number of the slots is used to receive wireless communications and wherein a second number of the slots is used to transmit wireless communications, wherein the first number is greater than the second number.

140. A radiotelephone according to claim 136 wherein the at least one time-division duplex frequency that is used to transmit wireless communications and to receive wireless communications at different times comprises a frame including a plurality of slots, wherein at least a first one of the slots is used to receive wireless communications using EDGE modulation and/or protocol and wherein at least a second one of the slots is used to transmit wireless communications using GPRS modulation and/or protocol.

141. A radiotelephone according to claim 136 wherein the at least one time-division duplex frequency that is used to transmit wireless communications and to receive wireless communications at different times comprises a frame including a plurality of slots, wherein at least a first one of the slots is used to receive wireless communications using a first modulation and/or protocol and wherein at least a second one of the slots is used to transmit wireless communications using a second modulation and/or protocol, wherein the first modulation and/or protocol is more spectrally efficient than the second modulation and/or protocol.

142. A radiotelephone according to claim 128 wherein the modified second range of satellite band forward link frequencies includes a plurality of frequencies in the second range of satellite band forward link frequencies that are received by the radiotelephone at a power level that monotonically decreases as a function of frequency.

143. A radiotelephone according to claim 142 wherein the power level is a maximum power level.

144. A radiotelephone according to claim 142 wherein the modified second range of satellite band forward link frequencies includes a subset of frequencies proximate to a first or second end of the second range of satellite band forward link frequencies that are received by the radiotelephone at a power level that monotonically decreases toward the first or second end of the second range of satellite band forward link frequencies.

145. A radiotelephone according to claim 144 wherein the power level is a maximum power level.

146. A radiotelephone according to claim 144 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the modified second range of satellite-band forward link frequencies includes a subset of frequencies proximate to an end of the second range of satellite band forward link frequencies adjacent the GPS/GLONASS frequencies that are received by the radiotelephone at a power level that monotonically decreases toward the end of the second range of satellite band forward link frequencies adjacent the GPS/GLONASS frequencies.

147. A radiotelephone according to claim 146 wherein the power level is a maximum power level.

148. A radiotelephone according to claim 142 wherein the modified second range of satellite band forward link frequencies includes a plurality of frequencies in the second range of satellite band forward link frequencies that are received by the radiotelephone as a function of a distance and/or signal propagation loss of the radiotelephone from the ancillary terrestrial component and at a power level that monotonically decreases as a function of frequency.

149. A radiotelephone according to claim 148 wherein the power level is a maximum power level.

150. A radiotelephone according to claim 128 wherein at least one frequency in the modified second range of satellite band forward link frequencies that is received by the radiotelephone comprises a frame including a plurality of slots and wherein at least two contiguous slots in the frame that is received by the radiotelephones are left unoccupied.

151. A radiotelephone according to claim 128 wherein at least one frequency in the modified second range of satellite band forward link frequencies that is received by the radiotelephone comprises a frame including a plurality of slots and wherein at least two contiguous slots in the frame that is received by the radiotelephone are transmitted at lower power than remaining slots in the frame that is received by the radiotelephone.

152. A radiotelephone according to claim 151 wherein the at least two contiguous slots are transmitted at lower power by the ancillary terrestrial component to the radiotelephone that is relatively close and/or has lower propagation signal loss to the ancillary terrestrial component and wherein the remaining slots are transmitted at higher power by the ancillary terrestrial component to the radiotelephone that is relatively far and/or has high propagation signal loss from the ancillary terrestrial component.

153. A radiotelephone according to claim 151 wherein the at least one frequency is proximate to a first or second end of the second range of satellite band forward link frequencies that are received by the radiotelephone.

154. A radiotelephone according to claim 153 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the at least one frequency is proximate to an end of the second range of satellite band forward link frequencies adjacent the GPS/GLONASS frequencies that are received by the radiotelephone.

155. A radiotelephone comprising:
an electronics system that is configured to communicate with a space-based component by transmitting wireless communications to the space-based component over a first range of satellite band return link frequencies and by receiving wireless communications from the space-based component over a second range of satellite band forward link frequencies that is spaced apart from the first range;
the electronics system also being configured to communicate with a multiple mode ancillary terrestrial component by transmitting wireless communications to the ancillary terrestrial component over the first range of satellite band return link frequencies and by receiving wireless communications from the ancillary terrestrial component over a second range of satellite band forward link frequencies that is spaced apart from the first range in a first mode of operation and to transmit wireless communications to the ancillary terrestrial component over at least a subset of the second range of satellite band forward link frequencies and to receive wireless communications from the ancillary terrestrial component over at least a subset of the first range of satellite band return link frequencies that is spaced apart from the second range in a second mode of operation.

156. A radiotelephone according to claim 155 wherein the electronics system is selectively configured to transmit wireless communications over all of the second range of satellite band forward link frequencies and to receive wireless communications over all of the first range of satellite band return link frequencies in the second mode of operation.

157. A radiotelephone comprising:
an electronics system that is configured to communicate with a space-based component by transmitting wireless communications to the space-based component over a first range of satellite band return link frequencies and by receiving wireless communications from the space-based component over a second range of satellite band forward link frequencies that is spaced apart from the first range;

the electronics system also being configured to communicate with an ancillary terrestrial component by receiving wireless communications from the ancillary terrestrial component over a modified second range of satellite band forward link frequencies.

158. A radiotelephone according to claim 157 wherein the modified second range of satellite band forward link frequencies is selected to reduce, compared to the second range of satellite band forward link frequencies, interference with wireless receivers that operate outside the second range of satellite band forward link frequencies.

159. A radiotelephone according to claim 157 wherein the electronics system also is configured to transmit wireless communications to the ancillary terrestrial component over a modified first range of satellite band return link frequencies that is spaced apart from the second range.

160. A radiotelephone according to claim 157 wherein the first range of satellite band return link frequencies and the second range of satellite band forward link frequencies both are contained in an L-band of satellite frequencies.

161. A radiotelephone according to claim 157 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the modified second range of satellite band forward link frequencies is selected to reduce, compared to the second range of satellite band forward link frequencies, interference with GPS/GLONASS wireless receivers.

162. A radiotelephone according to claim 157 wherein the modified second range of satellite band forward link frequencies includes only a subset of the second range of satellite band forward link frequencies so as to provide a guard band within the second range of satellite band forward link frequencies that is not used to receive wireless communications from the ancillary terrestrial component.

163. A radiotelephone according to claim 162 wherein the modified second range of satellite band forward link frequencies includes only a subset proximate to a low frequency portion of the second range of satellite band forward link frequencies so as to provide a guard band at a high frequency portion of the second range of satellite band forward link frequencies that is not used to receive wireless communications from the ancillary terrestrial component.

164. A radiotelephone according to claim 163 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the modified second range of satellite band forward link frequencies includes only a portion of the second range of satellite band forward link frequencies that is remote from the GPS/GLONASS frequencies so as to provide a guard band in a portion of the second range of satellite band forward link frequencies that is adjacent the GPS/GLONASS frequencies.

165. A radiotelephone according to claim 162 wherein the electronics system also is configured to transmit wireless communications to the ancillary terrestrial component over a modified first range of satellite band return link frequencies that is spaced apart from the second range, the modified first range of satellite band return link frequencies including at least one time-division duplex frequency that is used to receive wireless communications from and to transmit wireless communications to the ancillary terrestrial component at different times.

166. A radiotelephone system to claim 165 wherein the at least one time-division duplex frequency that is used to receive wireless communications and to transmit wireless communications to the ancillary terrestrial component at different times comprises a frame including a plurality of slots, wherein at least a first one of the slots is used to transmit wireless communications and wherein at least a second one of the slots is used to receive wireless communications.

167. A radiotelephone according to claim 165 wherein the modified first range of satellite band return link frequencies comprises the entire first range of satellite band return link frequencies that is time division multiplexed to transmit wireless communications and to receive wireless communications at different times.

168. A radiotelephone according to claim 165 wherein the at least one time-division duplex frequency that is used to receive wireless communications and to transmit wireless communications at different times comprises a frame including a plurality of slots, wherein a first number of the slots is used to receive wireless communications and wherein a second number of the slots is used to transmit wireless communications, wherein the first number is greater than the second number.

169. A radiotelephone according to claim 165 wherein the at least one time-division duplex frequency that is used to transmit wireless communications and to receive wireless communications at different times comprises a frame including a plurality of slots, wherein at least a first one of the slots is used to receive wireless communications using EDGE modulation and/or protocol and wherein at least a second one of the slots is used to transmit wireless communications using GPRS modulation and/or protocol.

170. A radiotelephone according to claim 165 wherein the at least one time-division duplex frequency that is used to transmit wireless communications and to receive wireless communications at different times comprises a frame including a plurality of slots, wherein at least a first one of the slots is used to receive wireless communications using a first modulation and/or protocol and wherein at least a second one of the slots is used to transmit wireless communications using a second modulation and/or protocol, and wherein the first modulation and/or protocol is more spectrally efficient than the second modulation and/or protocol.

171. A radiotelephone according to claim 157 wherein the modified second range of satellite band forward link frequencies includes a plurality of frequencies in the second range of satellite band forward link frequencies that are transmitted by the ancillary terrestrial component at a power level that monotonically decreases as a function of frequency.

172. A radiotelephone according to claim 171 wherein the power level is a maximum power level.

173. A radiotelephone according to claim 171 wherein the modified second range of satellite band forward link frequencies includes a subset of frequencies proximate to a first or second end of the second range of satellite band forward link frequencies that are transmitted by the ancillary terrestrial component at a power level that monotonically decreases toward the first or second end of the second range of satellite band forward link frequencies.

174. A radiotelephone according to claim 173 wherein the power level is a maximum power level.

175. A radiotelephone according to claim 173 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the modified second range of satellite band forward link frequencies includes a subset of frequencies proximate to an end of the second range of satellite band forward link frequencies adjacent the GPS/GLONASS frequencies that are transmitted by the ancillary terrestrial component at a power level that monotonically decreases toward the end of the second range of satellite band forward link frequencies adjacent the GPS/GLONASS frequencies.

176. A radiotelephone according to claim 175 wherein the power level is a maximum power level.

177. A radiotelephone according to claim 171 wherein the modified second range of satellite band forward link frequencies includes a plurality of frequencies in the second range of satellite band forward link frequencies that are transmitted by the ancillary terrestrial component as a function of a distance and/or propagation loss of the radiotelephone from the ancillary terrestrial component and at a power level that monotonically decreases as a function of frequency.

178. A radiotelephone according to claim 177 wherein the power level is a maximum power level.

179. A radiotelephone according to claim 157 wherein at least one frequency in the modified second range of satellite band forward link frequencies that is received by the radiotelephone comprises a frame including a plurality of slots; and wherein at least two contiguous slots in the frame that is received by the radiotelephone are left unoccupied.

180. A radiotelephone according to claim 157 wherein at least one frequency in the modified second range of satellite band forward link frequencies that is received by the radiotelephone comprises a frame including a plurality of slots and wherein at least two contiguous slots in the frame that is received by the radiotelephone are transmitted at lower power than remaining slots in the frame that is received by the radiotelephone.

181. A radiotelephone according to claim 180 wherein the at least two contiguous slots are transmitted at lower power to the radiotelephone that is relatively close and/or has low propagation loss to the ancillary terrestrial component and wherein the remaining slots are transmitted at higher power to the radiotelephone that is relatively far and/or has high propagation loss from the ancillary terrestrial component.

182. A radiotelephone according to claim 180 wherein the at least one frequency is proximate to a first or second end of the second range of satellite band forward link frequencies.

183. A radiotelephone according to claim 182 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the at least one frequency is proximate to an end of the second range of satellite band forward link frequencies adjacent the GPS/GLONASS frequencies.

184. A radiotelephone comprising:
an electronics system that is configured to selectively communicate with a multiple mode ancillary terrestrial component by transmitting wireless communications to the ancillary terrestrial component over a first range of satellite band return link frequencies and by receiving wireless communications from the ancillary terrestrial component over a second range of satellite band forward link frequencies that is spaced apart from the first range in a first mode of operation and to receive wireless communications from the ancillary terrestrial component over a modified second range of satellite band forward link frequencies in a second mode of operation.

185. A radiotelephone according to claim 184 wherein the modified second range of satellite band forward link frequencies is selected to reduce, compared to the second range of satellite band forward link frequencies, interference with wireless receivers that operate outside the second range of satellite band forward link frequencies.

186. A radiotelephone according to claim 184 wherein the electronics system also is selectively configured to transmit wireless communications over a modified first range of satellite band return link frequencies that is spaced apart from the second range in the second mode of operation.

187. A radiotelephone according to claim 184 wherein the first range of satellite band return link frequencies and the second range of satellite band forward link frequencies both are contained in an L-band of satellite frequencies.

188. A radiotelephone according to claim 184 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the modified second range of satellite band forward link frequencies is selected to reduce, compared to the second range of satellite band forward link frequencies, interference with GPS/GLONASS wireless receivers.

189. A radiotelephone according to claim 184 wherein the modified second range of satellite band forward link frequencies includes only a subset of the second range of satellite band forward link frequencies so as to provide a guard band within the second range of satellite band forward link frequencies that is not used to transmit wireless communications from the multiple mode ancillary terrestrial component to the radiotelephone.

190. A radiotelephone according to claim 189 wherein the modified second range of satellite band forward link frequencies includes only a subset proximate to a low frequency portion of the second range of satellite band forward link frequencies so as to provide a guard band at a high frequency portion of the second range of satellite band forward link frequencies that is not used to transmit wireless communications from the multiple mode ancillary terrestrial component to the radiotelephone.

191. A radiotelephone according to claim 190 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the modified second range of satellite band forward link frequencies includes only a portion of the second range of satellite band forward link frequencies that is remote from the GPS/GLONASS frequencies so as to provide a guard band in a portion of the second range of satellite band forward link frequencies that is adjacent the GPS/GLONASS frequencies.

192. A radiotelephone according to claim 189 wherein the electronics system also is selectively configured to transmit wireless communications over a modified first range of satellite band return link frequencies that is spaced apart from the second range in the second mode of operation, the modified first range of satellite band return link frequencies including at least one time-division duplex frequency that is used to receive wireless communications and to transmit wireless communications at different times.

193. A radiotelephone according to claim 192 wherein the at least one time-division duplex frequency that is used to receive wireless communications and to transmit wireless communications at different times comprises a frame including a plurality of slots, wherein at least a first one of the slots is used to transmit wireless communications and wherein at least a second one of the slots is used to receive wireless communications.

194. A radiotelephone according to claim 192 wherein the modified first range of satellite band return link frequencies comprises the entire first range of satellite band return link frequencies that is time division multiplexed to transmit wireless communications and to receive wireless communications at different times.

195. A radiotelephone according to claim 192 wherein the at least one time-division duplex frequency that is used to transmit wireless communications and to receive wireless communications at different times comprises a frame including a plurality of slots, wherein a first number of the slots is used to receive wireless communications and wherein a second number of the slots is used to transmit wireless communications, wherein the first number is greater than the second number.

196. A radiotelephone according to claim 192 wherein the at least one time-division duplex frequency that is used to transmit wireless communications and to receive wireless communications at different times comprises a frame including a plurality of slots, wherein at least a first one of the slots is used to receive wireless communications using EDGE modulation and/or protocol and wherein at least a second one of the slots is used to transmit wireless communications using GPRS modulation and/or protocol.

197. A radiotelephone according to claim 136 wherein the at least one time-division duplex frequency that is used to transmit wireless communications and to receive wireless communications at different times comprises a frame including a plurality of slots, wherein at least a first one of the slots is used to receive wireless communications using a first modulation and/or protocol and wherein at least a second one of the slots is used to transmit wireless communications using a second modulation and/or protocol, wherein the first modulation and/or protocol is more spectrally efficient than the second modulation and/or protocol.

198. A radiotelephone according to claim 184 wherein the modified second range of satellite band forward link frequencies includes a plurality of frequencies in the second range of satellite band forward link frequencies that are received by the satellite radiotelephone at a power level that monotonically decreases as a function of frequency.

199. A radiotelephone according to claim 198 wherein the power level is a maximum power level.

200. A radiotelephone according to claim 198 wherein the modified second range of satellite band forward link frequencies includes a subset of frequencies proximate to a first or second end of the second range of satellite band forward link frequencies that are received by the radiotelephone at a power level that monotonically decreases toward the first or second end of the second range of satellite band forward link frequencies.

201. A radiotelephone according to claim 200 wherein the power level is a maximum power level.

202. A radiotelephone according to claim 200 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the modified second range of satellite band forward link frequencies includes a subset of frequencies proximate to an end of the second range of satellite band forward link frequencies adjacent the GPS/GLONASS frequencies that are received by the radiotelephone at a power level that monotonically decreases toward the end of the second range of satellite band forward link frequencies adjacent the GPS/GLONASS frequencies.

203. A radiotelephone according to claim 202 wherein the power level is a maximum power level.

204. A radiotelephone according to claim 198 wherein the modified second range of satellite band forward link frequencies includes a plurality of frequencies in the second range of satellite band forward link frequencies that are received by the radiotelephone as a function of a distance and/or propagation loss of the radiotelephone from the ancillary terrestrial component and at a power level that monotonically decreases as a function of frequency.

205. A radiotelephone according to claim 204 wherein the power level is a maximum power level.

206. A radiotelephone according to claim 184 wherein at least one frequency in the modified second range of satellite band forward link frequencies that is received by the radiotelephone comprises a frame including a plurality of slots and wherein at least two contiguous slots in the frame that is received by the radiotelephones are left unoccupied.

207. A radiotelephone according to claim 184 wherein at least one frequency in the modified second range of satellite band forward link frequencies that is received by the radiotelephone comprises a frame including a plurality of slots and wherein at least two contiguous slots in the frame that is received by the radiotelephone are transmitted at lower power than remaining slots in the frame that is received by the radiotelephone.

208. A radiotelephone according to claim 207 wherein the at least two contiguous slots are transmitted at lower power by the ancillary terrestrial component to the radiotelephone that is relatively close and/or has low propagation loss to the ancillary terrestrial component and wherein the remaining slots are transmitted at higher power by the ancillary terrestrial component to the radiotelephone that is relatively far and/or has high propagation loss from the ancillary terrestrial component.

209. A radiotelephone according to claim 207 wherein the at least one frequency is proximate to a first or second end of the second range of satellite band forward link frequencies that are received by the radiotelephone.

210. A radiotelephone according to claim 209 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the at least one frequency is proximate to an end of the second range of satellite band forward link frequencies adjacent the GPS/GLONASS frequencies that are received by the radiotelephone.

211. A radiotelephone comprising:
   an electronics system that is configured to communicate with a multiple mode ancillary terrestrial component by transmitting wireless communications to the ancillary terrestrial component over a first range of satellite band return link frequencies and by receiving wireless communications from the ancillary terrestrial component over a second range of satellite band forward link frequencies that is spaced apart from the first range in a first mode of operation and to transmit wireless communications to the ancillary terrestrial component over at least a subset of the second range of satellite band forward link frequencies and to receive wireless communications from the ancillary terrestrial component over at least a subset of the first range of satellite band return link frequencies that is spaced apart from the second range in a second mode of operation.

212. A radiotelephone according to claim 211 wherein the electronics system is selectively configured to transmit wireless communications over all of the second range of satellite band forward link frequencies and to receive wireless communications over all of the first range of satellite band return link frequencies in the second mode of operation.

213. A radiotelephone comprising:
an electronics system that is configured to communicate with an ancillary terrestrial component by receiving wireless communications from the ancillary terrestrial component over a modified second range of satellite band forward link frequencies.

214. A radiotelephone according to claim 213 wherein the modified second range of satellite band forward link frequencies is selected to reduce, compared to the second range of satellite band forward link frequencies, interference with wireless receivers that operate outside the second range of satellite band forward link frequencies.

215. A radiotelephone according to claim 213 wherein the electronics system also is configured to transmit wireless communications to the ancillary terrestrial component over a modified first range of satellite band return link frequencies that is spaced apart from the second range.

216. A radiotelephone according to claim 213 wherein the first range of satellite band return link frequencies and the second range of satellite band forward link frequencies both are contained in an L-band of satellite frequencies.

217. A radiotelephone according to claim 213 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the modified second range of satellite band forward link frequencies is selected to reduce, compared to the second range of satellite band forward link frequencies, interference with GPS/GLONASS wireless receivers.

218. A radiotelephone according to claim 213 wherein the modified second range of satellite band forward link frequencies includes only a subset of the second range of satellite band forward link frequencies so as to provide a guard band within the second range of satellite band forward link frequencies that is not used to receive wireless communications from the ancillary terrestrial component.

219. A radiotelephone according to claim 218 wherein the modified second range of satellite band forward link frequencies includes only a subset proximate to a low frequency portion of the second range of satellite band forward link frequencies so as to provide a guard band at a high frequency portion of the second range of satellite band forward link frequencies that is not used to receive wireless communications from the ancillary terrestrial component.

220. A radiotelephone according to claim 219 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the modified second range of satellite band forward link frequencies includes only a portion of the second range of satellite band forward link frequencies that is remote from the GPS/GLONASS frequencies so as to provide a guard band in a portion of the second range of satellite band forward link frequencies that is adjacent the GPS/GLONASS frequencies.

221. A radiotelephone according to claim 218 wherein the electronics system also is configured to transmit wireless communications to the ancillary terrestrial component over a modified first range of satellite band return link frequencies that is spaced apart from the second range, the modified first range of satellite band return link frequencies including at least one time-division duplex frequency that is used to receive wireless communications from and to transmit wireless communications to the ancillary terrestrial component at different times.

222. A radiotelephone according to claim 221 wherein the at least one time-division duplex frequency that is used to receive wireless communications and to transmit wireless communications to the ancillary terrestrial component at different times comprises a frame including a plurality of slots, wherein at least a first one of the slots is used to transmit wireless communications and wherein at least a second one of the slots is used to receive wireless communications.

223. A radiotelephone according to claim 221 wherein the modified first range of satellite band return link frequencies comprises the entire first range of satellite band return link frequencies that is time division multiplexed to transmit wireless communications and to receive wireless communications at different times.

224. A radiotelephone according to claim 221 wherein the at least one time-division duplex frequency that is used to receive wireless communications and to transmit wireless communications at different times comprises a frame including a plurality of slots, wherein a first number of the slots is used to receive wireless communications and wherein a second number of the slots is used to transmit wireless communications, wherein the first number is greater than the second number.

225. A radiotelephone according to claim 221 wherein the at least one time-division duplex frequency that is used to transmit wireless communications and to receive wireless communications at different times comprises a frame including a plurality of slots, wherein at least a first one of the slots is used to receive wireless communications using EDGE modulation and/or protocol and wherein at least a second one of the slots is used to transmit wireless communications using GPRS modulation and/or protocol.

226. A radiotelephone according to claim 221 wherein the at least one time-division duplex frequency that is used to transmit wireless communications and to receive wireless communications at different times comprises a frame including a plurality of slots, wherein at least a first one of the slots is used to receive wireless communications using a first modulation and/or protocol and wherein at least a second one of the slots is used to transmit wireless communications using a second modulation and/or protocol, and wherein the first modulation and/or protocol is more spectrally efficient than the second modulation and/or protocol.

227. A radiotelephone according to claim 213 wherein the modified second range of satellite band forward link frequencies includes a plurality of frequencies in the second range of satellite band forward link frequencies that are transmitted by the ancillary terrestrial component at a power level that monotonically decreases as a function of frequency.

228. A radiotelephone according to claim 227 wherein the power level is a maximum power level.

229. A radiotelephone according to claim 227 wherein the modified second range of satellite band forward link frequencies includes a subset of frequencies at a first or second end of the second range of satellite band forward link frequencies that are transmitted by the ancillary terrestrial component at a power level that monotonically decreases toward the first or second end of the second range of satellite band forward link frequencies.

230. A radiotelephone according to claim 229 wherein the power level is a maximum power level.

231. A radiotelephone according to claim 229 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the modified second range of satellite band forward link frequencies includes a subset of frequencies proximate to an end of the second range of satellite band forward link frequencies adjacent the GPS/GLONASS frequencies that are transmitted by the ancillary terrestrial component at a power level that monotonically decreases toward the end of the second range of satellite band forward link frequencies adjacent the GPS/GLONASS frequencies.

232. A radiotelephone according to claim 231 wherein the power level is a maximum power level.

233. A radiotelephone according to claim 229 wherein the modified second range of satellite band forward link frequencies includes a plurality of frequencies in the second range of satellite band forward link frequencies that are transmitted by the ancillary terrestrial component as a function of a distance and/or propagation loss of the radiotelephone from the ancillary terrestrial component and at a power level that monotonically decreases as a function of frequency.

234. A radiotelephone according to claim 233 wherein the power level is a maximum power level.

235. A radiotelephone according to claim 213 wherein at least one frequency in the modified second range of satellite band forward link frequencies that is received by the radiotelephone comprises a frame including a plurality of slots and wherein at least two contiguous slots in the frame that is received by the radiotelephone are left unoccupied.

236. A radiotelephone according to claim 213 wherein at least one frequency in the modified second range of satellite band forward link frequencies that is received by the radiotelephone comprises a frame including a plurality of slots and wherein at least two contiguous slots in the frame that is received by the radiotelephone are transmitted at lower power than remaining slots in the frame that is received by the radiotelephone.

237. A radiotelephone according to claim 236 wherein the at least two contiguous slots are transmitted at lower power to the radiotelephone that is relatively close and/or has low propagation loss to the ancillary terrestrial component and wherein the remaining slots are transmitted at higher power to the radiotelephone that is relatively far and/or has high propagation loss from the ancillary terrestrial component.

238. A radiotelephone according to claim 236 wherein the at least one frequency is proximate to a first or second end of the second range of satellite band forward link frequencies.

239. A radiotelephone according to claim 238 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the at least one frequency is proximate to an end of the second range of satellite band forward link frequencies adjacent the GPS/GLONASS frequencies.

240. A satellite radiotelephone communication method comprising:

receiving wireless communications at a space-based component from a first radiotelephone in a satellite footprint over a satellite radiotelephone frequency band;

receiving wireless communications at an ancillary terrestrial network from a second radiotelephone in the satellite footprint over the satellite radiotelephone frequency band, the space-based component also receiving the wireless communications from the second radiotelephone in the satellite footprint over the satellite radiotelephone frequency band as interference along with the wireless communications that are received from the first radiotelephone in the satellite footprint over the satellite radiotelephone frequency band; and reducing the interference from the wireless communications that are received by the space-based component from the second radiotelephone in the satellite footprint over the satellite radiotelephone frequency band using the wireless communications that are received by the ancillary terrestrial network from the second radiotelephone in the satellite footprint over the satellite radiotelephone frequency band.

241. A method according to claim 240 wherein the ancillary terrestrial network is closer to the first and second radiotelephones than to the space-based component such that the wireless communications from the second radiotelephone are received by the ancillary terrestrial network prior to reception by the space based component and wherein the reducing comprises:

generating at least one delayed replica of the wireless communications from the second radiotelephone that are received by the ancillary terrestrial network; and subtracting the delayed replica of the wireless communications from the second radiotelephone that are received by the ancillary terrestrial network from the wireless communications that are received from the space-based component.

242. A method according to claim 240 further comprising:

receiving wireless communications at the space-based component from radiotelephones over a first range of satellite band return link frequencies;

transmitting wireless communications from the space-based component to the radiotelephones over a second range of satellite band forward link frequencies that is spaced apart from the first range;

receiving wireless communications from the radiotelephones over the first range of satellite band return link frequencies at the ancillary terrestrial network and transmitting wireless communications from the ancillary terrestrial network to the radiotelephones over the second range of satellite band forward link frequencies that is spaced apart from the first range in a first mode of operation; and transmitting wireless communications from the ancillary terrestrial network to the radiotelephones over a modified second range of satellite band forward link frequencies in a second mode of operation.

243. A method according to claim 240 wherein the modified second range of satellite band forward link frequencies is selected to reduce, compared to the second range of satellite band forward link frequencies, interference with wireless receivers that operate outside the second range of satellite band forward link frequencies.

244. A method according to claim 240 wherein the modified second range of satellite band forward link frequencies includes only a subset of the second range of satellite band forward link frequencies so as to provide a guard band within the second range of satellite band forward link frequencies that is not used to transmit wireless communications from the ancillary terrestrial network to the radiotelephones.

245. A method according to claim 240 wherein the modified second range of satellite band forward link frequencies includes a plurality of frequencies in the second range of satellite band forward link frequencies that are transmitted by the ancillary terrestrial network to the radiotelephones at a power level that monotonically decreases as a function of frequency.

246. A method according to claim 245 wherein the power level is a maximum power level.

247. A method according to claim 240 wherein at least one frequency in the modified second range of satellite band forward link frequencies that is transmitted by the ancillary terrestrial network to the radiotelephones comprises a frame including a plurality of slots and wherein at least two contiguous slots in the frame that is transmitted by the ancillary terrestrial network to the radiotelephones are left unoccupied.

248. A method according to claim 240 wherein at least one frequency in the modified second range of satellite band forward link frequencies that is transmitted by the ancillary terrestrial network to the radiotelephones comprises a frame including a plurality of slots and wherein at least two contiguous slots in the frame that is transmitted by the ancillary terrestrial network to the radiotelephones are transmitted at lower power than remaining slots in the frame that is transmitted by the ancillary terrestrial network to the radiotelephones.

249. A method according to claim 240 further comprising:
receiving wireless communications at the space-based component from radiotelephones over the first range of satellite band return link frequencies;
transmitting wireless communications from the space-based component to the radiotelephones over the second range of satellite band forward link frequencies that is spaced apart from the first range;
receiving wireless communications from the radiotelephones at the ancillary terrestrial network over a first range of satellite band return link frequencies;
transmitting wireless communications from the ancillary terrestrial network to the radiotelephones over a second range of satellite band forward link frequencies that is spaced apart from the first range in a first mode of operation; and
receiving wireless communications at the ancillary terrestrial network from the radiotelephones over at least a subset of the second range of satellite band forward link frequencies and transmitting wireless communications from the ancillary terrestrial network to the radiotelephones over at least a subset of the first range of satellite band return link frequencies that is spaced apart from the second range in a second mode of operation.

250. A satellite radiotelephone communication method comprising:
receiving wireless communications at a space-based component from radiotelephones over a first range of satellite band return link frequencies;
transmitting wireless communications from the space-based component to the radiotelephones over a second range of satellite band forward link frequencies that is spaced apart from the first range;
receiving wireless communications at an ancillary terrestrial component from the radiotelephones over the first range of satellite band return link frequencies and transmitting wireless communications from the ancillary terrestrial component to the radiotelephones over the second range of satellite band forward link frequencies that is spaced apart from the first range in a first mode of operation; and
transmitting wireless communications from the ancillary terrestrial component to the radiotelephones over a modified second range of satellite band forward link frequencies in a second mode of operation.

251. A method according to claim 250 wherein the modified second range of satellite band forward link frequencies is selected to reduce, compared to the second range of satellite band forward link frequencies, interference with wireless receivers that operate outside the second range of satellite band forward link frequencies.

252. A method according to claim 250 further comprising:
receiving wireless communications from the radiotelephones at the ancillary terrestrial component over a modified first range of satellite band return link frequencies that is spaced apart from the second range in the second mode of operation.

253. A method according to claim 250 wherein the first range of satellite band return link frequencies and the second range of satellite band forward link frequencies both are contained in an L-band of satellite frequencies.

254. A method according to claim 250 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the modified second range of satellite band forward link frequencies is selected to reduce, compared to the second range of satellite band forward link frequencies, interference with GPS/GLONASS wireless receivers.

255. A method according to claim 250 wherein the modified second range of satellite band forward link frequencies includes only a subset of the second range of satellite band forward link frequencies so as to provide a guard band within the second range of satellite band forward link frequencies that is not used to transmit wireless communications from the multiple mode ancillary terrestrial component to the radiotelephones.

256. A method according to claim 250 wherein the modified second range of satellite band forward link frequencies includes only a subset proximate to a low frequency portion of the second range of satellite band forward link frequencies so as to provide a guard band at a high frequency portion of the second range of satellite band forward link frequencies that is not used to transmit wireless communications from the multiple mode ancillary terrestrial component to the radiotelephones.

257. A method according to claim 256 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the modified second range of satellite band forward link frequencies includes only a portion of the second range of satellite band forward link frequencies that is remote from the GPS/GLONASS frequencies so as to provide a guard band in a portion of the second range of satellite band forward link frequencies that is adjacent the GPS/GLONASS frequencies.

258. A method according to claim 255 further comprising:
receiving wireless communications from the radiotelephones at the ancillary terrestrial component over a modified first range of satellite band return link frequencies that is spaced apart from the second range in the second mode of operation, the modified first range of satellite band return link frequencies including at least one time-division duplex frequency that is used to transmit wireless communications to the radiotelephones and to receive wireless communications from the radiotelephones at different times.

259. A method according to claim 258 wherein the at least one time-division duplex frequency that is used to transmit wireless communications to the radiotelephones and to receive wireless communications from the radiotelephones at different times comprises a frame including a plurality of slots, wherein at least a first one of the slots is used to transmit wireless communications to the radiotelephones and wherein at least a second one of the slots is used to receive wireless communications from the radiotelephones.

260. A method according to claim 258 wherein the modified first range of satellite band return link frequencies comprises the entire first range of satellite band return link frequencies that is time division multiplexed to transmit wireless communications to the radiotelephones and to receive wireless communications from the radiotelephones at different times.

261. A method according to claim 258 wherein the at least one time-division duplex frequency that is used to transmit wireless communications to the radiotelephones and to receive wireless communications from the radiotelephones at different times comprises a frame including a plurality of slots, wherein a first number of the slots is used to transmit wireless communications to the radiotelephones and wherein a second number of the slots is used to receive wireless communications from the radiotelephones, wherein the first number is greater than the second number.

262. A method according to claim 258 wherein the at least one time-division duplex frequency that is used to transmit wireless communications to the radiotelephones and to receive wireless communications from the radiotelephones at different times comprises a frame including a plurality of slots, wherein at least a first one of the slots is used to transmit wireless communications to the radiotelephones using EDGE modulation and/or protocol and wherein at least a second one of the slots is used to receive wireless communications from the satellite radiotelephones using GPRS modulation and/or protocol.

263. A method according to claim 258 wherein the at least one time-division duplex frequency that is used to transmit wireless communications to the radiotelephones and to receive wireless communications from the radiotelephones at different times comprises a frame including a plurality of slots, wherein at least a first one of the slots is used to transmit wireless communications to the radiotelephones using a first modulation and/or protocol and wherein at least a second one of the slots is used to receive wireless communications from the satellite radiotelephones using a second modulation and/or protocol, wherein the first modulation and/or protocol is more spectrally efficient than the second modulation and/or protocol.

264. A method according to claim 250 wherein the modified second range of satellite band forward link frequencies includes a plurality of frequencies in the second range of satellite band forward link frequencies that are transmitted by the ancillary terrestrial component to the radiotelephones at a power level that monotonically decreases as a function of frequency.

265. A method according to claim 264 wherein the power level is a maximum power level.

266. A method according to claim 264 wherein the modified second range of satellite band forward link frequencies includes a subset of frequencies proximate to a first or second end of the second range of satellite band forward link frequencies. that are transmitted by the ancillary terrestrial component to the radiotelephones at a power level that monotonically decreases toward the first or second end of the second range of satellite band forward link frequencies.

267. A method according to claim 266 wherein the power level is a maximum power level.

268. A method according to claim 266 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the modified second range of satellite band forward link frequencies includes a subset of frequencies proximate to an end of the second range of satellite band forward link frequencies adjacent the GPS/GLONASS frequencies that are transmitted by the ancillary terrestrial component to the radiotelephones at a power level that monotonically decreases toward the end of the second range of satellite band forward link frequencies adjacent the GPS/GLONASS frequencies.

269. A method according to claim 268 wherein the power level is a maximum power level.

270. A method according to claim 264 wherein the modified second range of satellite band forward link frequencies includes a plurality of frequencies in the second range of satellite band forward link frequencies that are transmitted by the ancillary terrestrial component to the radiotelephones as a function of a distance and/or signal propagation loss of a respective radiotelephone from the ancillary terrestrial component and at a power level that monotonically decreases as a function of frequency.

271. A method according to claim 270 wherein the power level is a maximum power level.

272. A method according to claim 250 wherein at least one frequency in the modified second range of satellite band forward link frequencies that is transmitted by the ancillary terrestrial component to the radiotelephones comprises a frame including a plurality of slots and wherein at least two contiguous slots in the frame that is transmitted by the ancillary terrestrial component to the radiotelephones are left unoccupied.

273. A method according to claim 250 wherein at least one frequency in the modified second range of satellite band forward link frequencies that is transmitted by the ancillary terrestrial component to the radiotelephones comprises a frame including a plurality of slots and wherein at least two contiguous slots in the frame that is transmitted by the ancillary terrestrial component to the radiotelephones are transmitted at lower power than remaining slots in the frame that is transmitted by the ancillary terrestrial component to the radiotelephones.

274. A method according to claim 273 wherein the at least two contiguous slots are transmitted at lower power by the ancillary terrestrial component to first selected ones of the radiotelephones that are relatively close and/or have low signal propagation loss to the ancillary terrestrial component and wherein the remaining slots are transmitted at higher power by the ancillary terrestrial component to second selected ones of the radiotelephones that are relatively far and/or have high signal propagation loss from the ancillary terrestrial component.

275. A method according to claim 273 wherein the at least one frequency is proximate to a first or second end of the second range of satellite band forward link frequencies that are transmitted by the ancillary terrestrial component to the radiotelephones.

276. A method according to claim 275 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the at least one frequency is proximate to an end of the second range of satellite band forward link frequencies adjacent the GPS/GLONASS frequencies that are transmitted by the ancillary terrestrial component to the radiotelephones.

277. A satellite radiotelephone communications method comprising:
receiving wireless communications from radiotelephones at a space-based component over a first range of satellite band return link frequencies;
transmitting wireless communications from the space-based component to the radiotelephones over a second range of satellite band forward link frequencies that is spaced apart from the first range;
receiving wireless communications from the radiotelephones at an ancillary terrestrial component over a first range of satellite band return link frequencies and transmitting wireless communications from the ancillary terrestrial component to the radiotelephones over a second range of satellite band forward link frequencies that is spaced apart from the first range in a first mode of operation; and
receiving wireless communications from the radiotelephones at the ancillary terrestrial component over at least a subset of the second range of satellite band forward link frequencies and transmitting wireless communications from the ancillary terrestrial component to the radiotelephones over at least a subset of the first range of satellite band return link frequencies that is spaced apart from the second range in a second mode of operation.

278. A method according to claim 277 further comprising:
receiving wireless communications at the ancillary terrestrial component from the radiotelephones over all of the second range of satellite band forward link frequencies and transmitting wireless communications from the ancillary terrestrial component to the radiotelephones over all of the first range of satellite band return link frequencies that is spaced apart from the second range in the second mode of operation.

279. A satellite radiotelephone communications method comprising:
receiving wireless communications from radiotelephones at a space-based component over a first range of satellite band return link frequencies;
transmitting wireless communications from the space-based component to the radiotelephones over a second range of satellite band forward link frequencies that is spaced apart from the first range; and
transmitting wireless communications from an ancillary terrestrial component to the radiotelephones over a modified second range of satellite band forward link frequencies.

280. A method according to claim 279 wherein the modified second range of satellite band forward link frequencies is selected to reduce, compared to the second range of satellite band forward link frequencies, interference with wireless receivers that operate outside the second range of satellite band forward link frequencies.

281. A method according to claim 279 further comprising:
receiving wireless communications from the radiotelephones at the ancillary terrestrial component over a modified first range of satellite band return link frequencies that is spaced apart from the second range.

282. A method according to claim 279 wherein the first range of satellite band return link frequencies and the second range of satellite band forward link frequencies both are contained in an L-band of satellite frequencies.

283. A method according to claim 279 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the modified second range of satellite band forward link frequencies is selected to reduce, compared to the second range of satellite band forward link frequencies, interference with GPS/GLONASS wireless receivers.

284. A method according to claim 279 wherein the modified second range of satellite band forward link frequencies includes only a subset of the second range of satellite band forward link frequencies so as to provide a guard band within the second range of satellite band forward link frequencies that is not used to transmit wireless communications from the ancillary terrestrial component to the radiotelephones.

285. A method according to claim 284 wherein the modified second range of satellite band forward link frequencies includes only a subset proximate to a low frequency portion of the second range of satellite band forward link frequencies so as to provide a guard band at a high frequency portion of the second range of satellite band forward link frequencies that is not used to transmit wireless communications from the ancillary terrestrial component to the radiotelephones.

286. A method according to claim 284 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the modified second range of satellite band forward link frequencies includes only a portion of the second range of satellite band forward link frequencies that is remote from the GPS/GLONASS frequencies so as to provide a guard band in a portion of the second range of satellite band forward link frequencies that is adjacent the GPS/GLONASS frequencies.

287. A method according to claim 284 further comprising:
receiving wireless communications from the radiotelephones at the ancillary terrestrial component over a modified first range of satellite band return link frequencies that is spaced apart from the second range, the modified first range of satellite band return link frequencies including at least one time-division duplex frequency that is used to transmit wireless communications to the radiotelephones and to receive wireless communications from the radiotelephones at different times.

288. A method according to claim 287 wherein the at least one time-division duplex frequency that is used to transmit wireless communications to the radiotelephones and to receive wireless communications from the radiotelephones at different times comprises a frame including a plurality of slots, wherein at least a first one of the slots is used to transmit wireless communications to the radiotelephones and wherein at least a second one of the slots is used to receive wireless communications from the radiotelephones.

289. A method according to claim 287 wherein the modified first range of satellite band return link frequencies comprises the entire first range of satellite band return link frequencies that is time division multiplexed to transmit wireless communications to the radiotelephones and to receive wireless communications from the radiotelephones at different times.

290. A method according to claim 287 wherein the at least one time-division duplex frequency that is used to transmit wireless communications to the radiotelephones and to receive wireless communications from the radiotelephones at different times comprises a frame including a plurality of slots, wherein a first number of the slots is used to transmit wireless communications to the radiotelephones and wherein a second number of the slots is used to receive wireless communications from the radiotelephones, wherein the first number is greater than the second number.

291. A method according to claim 287 wherein the at least one time-division duplex frequency that is used to transmit wireless communications to the radiotelephones and to receive wireless communications from the radiotelephones at different times comprises a frame including a plurality of slots, wherein at least a first one of the slots is used to transmit wireless communications to the radiotelephones using EDGE modulation and/or protocol and wherein at least a second one of the slots is used to receive wireless communications from the radiotelephones using GPRS modulation and/or protocol.

292. A method according to claim 287 wherein the at least one time-division duplex frequency that is used to transmit wireless communications to the radiotelephones and to receive wireless communications from the radiotelephones at different times comprises a frame including a plurality of slots, wherein at least a first one of the slots is used to transmit wireless communications to the radiotelephones using a first modulation and/or protocol and wherein at least a second one of the slots is used to receive wireless communications from the radiotelephones using a second modulation and/or protocol, wherein the first modulation and/or protocol is more spectrally efficient that the second modulation and/or protocol.

293. A method according to claim 279 wherein the modified second range of satellite band forward link frequencies includes a plurality of frequencies in the second range of satellite band forward link frequencies that are transmitted by the ancillary terrestrial component to the radiotelephones at a power level that monotonically decreases as a function of frequency.

294. A method according to claim 293 wherein the power level is a maximum power level.

295. A method according to claim 293 wherein the modified second range of satellite band forward link frequencies includes a subset of frequencies proximate to a first or second end of the second range of satellite band forward link frequencies that are transmitted by the ancillary terrestrial component to the radiotelephones at a power level that monotonically decreases toward the first or second end of the second range of satellite band forward link frequencies.

296. A method according to claim 295 wherein the power level is a maximum power level.

297. A method according to claim 295 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the modified second range of satellite band forward link frequencies includes a subset of frequencies at an end of the second range of satellite band forward link frequencies adjacent the GPS/GLONASS frequencies that are transmitted by the ancillary terrestrial component to the radiotelephones at a power level that monotonically decreases toward the end of the second range of satellite band forward link frequencies adjacent the GPS/GLONASS frequencies.

298. A method according to claim 297 wherein the power level is a maximum power level.

299. A method according to claim 293 wherein the modified second range of satellite band forward link frequencies includes a plurality of frequencies in the second range of satellite band forward link frequencies that are transmitted by the ancillary terrestrial component to the radiotelephones as a function of a distance and/or signal propagation of a respective satellite radiotelephone from the ancillary terrestrial component and at a power level that monotonically decreases as a function of frequency.

300. A method according to claim 299 wherein the power level is a maximum power level.

301. A method according to claim 279 wherein at least one frequency in the modified second range of satellite band forward link frequencies that is transmitted by the ancillary terrestrial component to the radiotelephones comprises a frame including a plurality of slots and wherein at least two contiguous slots in the frame that is transmitted by the ancillary terrestrial component to the radiotelephones are left unoccupied.

302. A method according to claim 270 wherein at least one frequency in the modified second range of satellite band forward link frequencies that is transmitted by the ancillary terrestrial component to the radiotelephones comprises a frame including a plurality of slots and wherein at least two contiguous slots in the frame that is transmitted by the ancillary terrestrial component to the radiotelephones are transmitted at lower power than remaining slots in the frame that is transmitted by the ancillary terrestrial component to the radiotelephones.

303. A method according to claim 302 wherein the at least two contiguous slots are transmitted at lower power by the ancillary terrestrial component to first selected ones of the radiotelephones that are relatively close and/or have low signal propagation loss to the ancillary terrestrial component and wherein the remaining slots are transmitted at higher power by the ancillary terrestrial component to second selected ones of the radiotelephones that are relatively far and/or have high signal propagation loss from the ancillary terrestrial component.

304. A method according to claim 302 wherein the at least one frequency is proximate to a first or second end of the second range of satellite band forward link frequencies that are transmitted by the ancillary terrestrial component to the radiotelephones.

305. A method according to claim 304 wherein the first range of satellite band return link frequencies is contained in an L-band of satellite frequencies above GPS/GLONASS frequencies, wherein the second range of satellite band forward link frequencies is contained in the L-band of satellite frequencies below the GPS/GLONASS frequencies and wherein the at least one frequency is proximate to an end of the second range of satellite band forward link frequencies adjacent the GPS/GLONASS frequencies that are transmitted by the ancillary terrestrial component to the radiotelephones.

* * * * *